US011111423B2

(12) United States Patent
Schümann et al.

(10) Patent No.: US 11,111,423 B2
(45) Date of Patent: Sep. 7, 2021

(54) THERMALLY VULCANIZABLE ADHESIVE TAPE WITH SHEAR STRENGTH DURING THE HEATING AND CURING PHASE

(71) Applicant: tesa SE

(72) Inventors: Uwe Schümann, Pinneberg (DE); Sebastian Dietze, Kaltenkirchen (DE); Christine Böhm, Marl (DE); Marten Papenbroock, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 16/353,054

(22) Filed: Mar. 14, 2019

(65) Prior Publication Data
US 2019/0284459 A1    Sep. 19, 2019

(30) Foreign Application Priority Data
Mar. 14, 2018    (DE) .................. 10 2018 203 894.5

(51) Int. Cl.
| | | |
|---|---|---|
| *C09J 187/00* | (2006.01) | |
| *C09J 7/38* | (2018.01) | |
| *C09J 11/04* | (2006.01) | |
| *C08G 18/75* | (2006.01) | |
| *C09J 175/14* | (2006.01) | |
| *C08G 18/32* | (2006.01) | |
| *C08G 18/69* | (2006.01) | |
| *C08G 18/12* | (2006.01) | |
| *C08G 18/22* | (2006.01) | |

(52) U.S. Cl.
CPC .......... *C09J 187/005* (2013.01); *C08G 18/12* (2013.01); *C08G 18/227* (2013.01); *C08G 18/3206* (2013.01); *C08G 18/698* (2013.01); *C08G 18/755* (2013.01); *C08G 18/758* (2013.01); *C09J 7/38* (2018.01); *C09J 11/04* (2013.01); *C09J 175/14* (2013.01); *C09J 2453/00* (2013.01)

(58) Field of Classification Search
CPC ... C09J 175/14; C09J 11/04; C09J 7/38; C09J 163/00; C08K 3/06; C08G 18/69; C08G 18/698; C08L 63/00
See application file for complete search history.

(56) References Cited

U.S. PATENT DOCUMENTS

| | | |
|---|---|---|
| 3,427,366 A | 2/1969 | Verdol et al. |
| 3,515,773 A | 6/1970 | Dahl |
| 3,743,617 A | 7/1973 | Kest |
| 4,343,339 A | 8/1982 | Schwindt et al. |
| 5,057,553 A | 10/1991 | Zagefka et al. |
| 5,149,742 A * | 9/1992 | Hemel ................. C08G 18/69 |
| | | 524/426 |
| 5,684,089 A | 11/1997 | Lanoye et al. |
| 6,063,494 A | 5/2000 | Schümann et al. |
| 6,472,475 B1 | 10/2002 | Lanoye et al. |
| 8,580,909 B2 | 11/2013 | Schümann et al. |
| 8,653,221 B2 | 2/2014 | Schümann et al. |
| 2009/0286950 A1 | 11/2009 | Schümann et al. |
| 2011/0111221 A1 | 5/2011 | Schümann et al. |
| 2011/0237760 A1 | 9/2011 | Schümann et al. |
| 2018/0208814 A1 | 7/2018 | Araki |

FOREIGN PATENT DOCUMENTS

| | | |
|---|---|---|
| DE | 1 645 358 A1 | 9/1970 |
| DE | 38 30 895 A1 | 3/1990 |
| EP | 0 009 613 A1 | 4/1980 |
| EP | 0 356 715 A1 | 3/1990 |
| EP | 0 877 069 A1 | 11/1998 |
| EP | 1 279 687 A2 | 1/2003 |
| EP | 2 119 735 A1 | 11/2009 |
| EP | 2 325 220 A1 | 5/2011 |
| JP | S59 230076 A | 12/1984 |
| WO | 98/030648 A1 | 7/1998 |
| WO | 2017/014185 A1 | 1/2017 |

OTHER PUBLICATIONS

European Search Report dated Jul. 19, 2018, issued in connection with European Application No. 19161803.2.
English translation of Office Action dated Jan. 26, 2021, in connection with Chinese Application No. 201910193774.3.
English translation of Chinese textbook, "Synthesis and Application of Fine Chemical Products", Cheng Lubai, Delian University of Technology Press, pp. 59-62, 2002.

* cited by examiner

*Primary Examiner* — Kregg T Brooks
(74) *Attorney, Agent, or Firm* — Norris McLaughlin, P.A.

(57) ABSTRACT

A thermally vulcanizable pressure-sensitive adhesive comprising a chemically precrosslinked, pressure-sensitively adhesive polybutadiene-polyurethane and ground sulfur, which during the heating phase remains pressure-sensitively adhesive, does not liquefy and hence in this phase, in which the vulcanization has not yet started and the curing has not yet commenced, has shear strength at least under load to moderate low, is able to transmit forces and hence to perform holding, a process for producing it, an adhesive tape comprising this pressure-sensitive adhesive, and a process for producing the adhesive tape.

8 Claims, No Drawings

THERMALLY VULCANIZABLE ADHESIVE TAPE WITH SHEAR STRENGTH DURING THE HEATING AND CURING PHASE

This application claims priority of German Patent Application No. DE 10 2018 203 894.5, filed Mar. 18, 2018, the entire contents of which are incorporated by reference herein.

The present invention relates to a chemically precrosslinked, thermally vulcanizable pressure-sensitive adhesive, to a process for producing it, to an adhesive tape comprising this pressure-sensitive adhesive, and to a process for producing the adhesive tape. The invention may be used as adhesive tape or sealing tape or as part of an adhesive or sealing tape in finishing operations in which operating temperatures of between 130° C. and 230° C. are available. Vulcanization starts within this temperature range, and the pressure-sensitive adhesive cures.

During the heating phase, the pressure-sensitive adhesive remains pressure-sensitively adhesive, does not liquefy, and undergoes only slight softening. In this phase, therefore, in which the vulcanization has not yet started and the curing has not yet commenced, it has shear strength at least under low to moderate load, and is able to transmit forces and so to perform holding. In many cases, accordingly, there is no need for preliminary fixing of the components to be bonded.

Thermally vulcanizable pressure-sensitive adhesive tapes are known. EP 877 069 A describes a pressure-sensitive adhesive sheet based on a thermally vulcanizable, polyesterified rubber. A disadvantage of this is a particular aspect of the production operation: the polyesterification reaction is initiated with liquid starting materials. The polymer is formed only during coating, by gradual advance of a crosslinking reaction. This has the disadvantage that the coating speed is limited, since in the state in which it is still liquid or pasty, the reaction mixture, coated onto a release liner or onto a carrier material, cannot be wound up, or at least not with constant layer thickness. Only solid polymer films can be wound up with constant layer thickness. It is therefore necessary to wait until the reaction has progressed to the point of solidification of the reaction mixture before the reaction product can be wound. The coating speed has to be set at a correspondingly slow rate.

Moreover, polyesterified rubbers have the potential disadvantage of easy hydrolytic cleavability.

The rubber described in DE 38 30 895 A, which is composed of at least two starting polymers which are linked chemically to one another by ester groups and of which at least one is olefinically unsaturated, has in principle similar disadvantages as a possible base elastomer of a thermally vulcanizable pressure-sensitive adhesive tape. The same is true of the liquid or spreadable, vulcanizable rubber mixture described in EP 0 356 715 A, which is based on polyesterified polymers of which at least one is olefinically unsaturated.

A pressure-sensitive polybutadiene-polyurethane adhesive is described in JP 59230076 A. A polybutadiene-polyol having a functionality of 2.2 to 2.4 is reacted therein with a polyisocyanate in an NCO/OH ratio of 0.2 to 0.65, to form a polyol having a molar mass of 5000 to 30 000 and a functionality of 2.0 to 2.4. This polyol is subsequently mixed with a polyisocyanate in an NCO/OH ratio of 0.6 to 1.0 and reacted accordingly to form the desired product. There is no indication of any possible use as a base polymer for a thermally vulcanizable pressure-sensitive adhesive which is to be prepared solventlessly in a compounding and coating operation. In relation to such a use, this pressure-sensitive adhesive would have the disadvantage either of being crosslinked at the outset and hence unsuitable for a coating operation, or, in the event that a very low NCO/OH ratio is operated within the limits specified in the patent, and so no crosslinking takes place, of being liquid at room temperature and therefore likewise unsuitable as a base elastomer for a coating operation.

U.S. Pat. No. 3,743,617 A discloses pressure-sensitive polyurethane adhesives based on the reaction product of diene polymers, carrying isocyanate-reactive groups, with isocyanate components in the presence of tackifier resins. A disadvantage here is the mandatory presence of tackifier resins, which could have disruptive consequences for the post-vulcanization adhesion properties of an adhesive tape produced from this product. Moreover, the patent is silent as to the issue of whether and, if so, how it is possible on this basis to produce a pressure-sensitively adhesive elastomer having a suitable melting or softening range for use in a solvent-free compounding and coating operation.

U.S. Pat. No. 3,515,773 A, for the purpose of producing pressure-sensitive adhesives, proposes the reaction of hydroxylated polybutadienes with aromatic isocyanates and/or with precursors based on aromatic isocyanates, and at the same time emphasizes that tackiness can be achieved without the use of tackifier resins and plasticizers. A disadvantage is the use of aromatic isocyanates, in view of the possible particular health hazards posed by this class of substance. This patent as well is silent as to the issue of whether and, if so, how it is possible on this basis to produce a pressure-sensitively adhesive elastomer having a suitable melting or softening range for use in a solvent-free compounding and coating operation. Nor is there any indication of a possible use as a base polymer for a thermally vulcanizable pressure-sensitive adhesive.

WO 1998030648 A describes pressure-sensitive thermoplastic polyurethane adhesives based on hydrogenated polydiene-diols and -monools. These adhesives, in view of the objective of finding a pressure-sensitively adhesive, meltable base elastomer for a thermally vulcanizable adhesive tape, have the disadvantage that they cannot be vulcanized thermally.

Described in EP 2119735 A is a hotmelt process for producing a chemically crosslinked polyurethane film by initiating the reaction of a hydroxyl-functionalized polyurethane hotmelt prepolymer with a polyisocyanate in a continuous mixing assembly, and subsequently coating the reacting melt emerging from the mixing assembly. Disclosed in EP 2325220 A1 (tesa) is a pressure-sensitive adhesive based on polyurethane that comprises the chemical reaction product of a hydroxyl-functionalized polyurethane hotmelt prepolymer with a diisocyanate/poly-isocyanate mixture. Both patents confine themselves in the examples to polyether-polyol-based polyurethanes. There are no indications of possible suitabilities for thermally vulcanizable pressure-sensitive adhesives.

It is an object of the invention to provide a pressure-sensitive adhesive which can be vulcanized thermally within a temperature range of 130° C. to 230° C. and which during the heating phase has shear strength at least under low to moderate load, and also to provide an adhesive tape comprising a pressure-sensitive adhesive of this kind. The thermally vulcanizable pressure-sensitive adhesive and the adhesive tape comprising said pressure-sensitive adhesive are therefore to be able, during the heating phase, in which the vulcanization has not yet started and in which known heat-curable adhesives typically commence liquefaction or at least substantial softening, to perform holding, meaning that there may be no need for preliminary fixing of the components to be bonded. On application in an adhesive bonding joint, the pressure-sensitive adhesive—especially in adhesive tape form—ought not to liquefy during the thermal vulcanization, i.e. strong heating, to such an extent that it emerges substantially from the adhesive bonding joint, by running out or being squeezed out, for instance.

This object is achieved by means of a chemically precrosslinked, thermally vulcanizable, pressure-sensitive adhesive, more particularly an adhesive tape comprising a chemically precrosslinked, thermally vulcanizable, pressure-sensitive adhesive, where the pressure-sensitive adhesive comprises at least one chemically precrosslinked, pressure-sensitively adhesive polybutadiene-polyurethane and also ground sulfur.

The invention offers the advantage that it is possible at a first location to produce a non-crosslinked polybutadiene-polyurethane—also referred to for the purposes of this specification as a polybutadiene-polyurethane prepolymer.

Independently of the site of production of the prepolymer, it can be melted at a second site and blended with substances and/or additives and in particular with the sulfur.

Independently of the second site, this sulfur-admixed prepolymer can be admixed at a third site with di- and/or polyisocyanates, shaped to form a layer or otherwise, and precrosslinked, so resulting in the precrosslinked product—more particularly a layer of an adhesive film.

This precrosslinked product can then be brought to the site of application, applied, and cured thermally.

Accordingly, the individual production sites can be selected completely independently of one another. Of course, certain or all of the aforesaid sites selected may also be identical—for example, the second and third sites.

Because of the precrosslinking, moreover, the dimensional stability of the thermally vulcanizable pressure-sensitive adhesive of the invention, even at elevated temperatures, is such that it does not run out or squeeze out of the adhesive bonding joint during the thermal vulcanization.

The present invention relates in particular to a thermally vulcanizable, pressure-sensitive adhesive which is already chemically precrosslinked prior to the thermal vulcanization and which prior to the chemical precrosslinking can be processed in a temperature range between approximately 40° C. and 100° C., initially as a melt, in a compounding and extrusion operation, and can be vulcanized thermally in a temperature range of between 130° C. and 230° C. and therefore can be cured to a high strength. For example, in the lap shear test according to DIN EN 1465, lap shear strengths of up to at least 30 N/mm$^2$ are achievable. The lap shear strength here can be controlled via the proportion of sulfur in relation to polybutadiene-polyurethane. The curing achieved with the thermal vulcanization includes a second chemical crosslinking additionally to the chemical precrosslinking which is already present before the thermal vulcanization. The chemical precrosslinking that is present before the thermal vulcanization (first chemical crosslinking) is preferably achieved through chemical reaction of a meltable, pressure-sensitively adhesive, hydroxyl-functionalized polybutadiene-polyurethane prepolymer with an aliphatic or alicyclic diisocyanate and/or preferably with an aliphatic or alicyclic polyisocyanate having an isocyanate-functionality of three or greater than three (for the purposes of this specification, this chemical reaction is referred to as "precrosslinking reaction").

Polybutadiene-polyurethanes are the reaction products of polybutadiene-polyols and/or derivatives thereof, optionally in the presence of further polyols and/or derivatives thereof, with diisocyanates and/or polyisocyanates having an isocyanate functionality of three or greater than three.

In accordance with the invention, the present specification, by polybutadiene-polyurethanes, means only the reaction products of polybutadiene-polyols and/or derivates thereof, optionally in the presence of further polyols and/or derivatives thereof, with aliphatic and/or alicyclic polyisocyanates.

The further polyols and/or derivatives thereof may with particular preference be monomeric and/or oligomeric compounds having a hydroxyl functionality of two and a molar mass of less than or equal to 300 g/mol. Such diols are also referred to in the context of this specification as "chain extenders".

Polyols for the purposes of this specification are polyhydric alcohols having two, three or more than three hydroxyl groups. Polyisocyanates are corresponding isocyanates having an isocyanate functionality of two or more.

Polyhydric polyols in the context of this specification are polyols having a hydroxyl functionality of more than two, while polyfunctional polyisocyanates, accordingly, are isocyanates having an isocyanate functionality of more than two.

Polybutadiene-polyurethane prepolymers in the sense of the presence specification are the non-crosslinked, meltable reaction products. The prepolymers are obtained by selecting the proportions of the reactants in such a way that hydroxyl groups are present in excess over the isocyanate groups. Preferably, therefore, the resulting macromolecules always have on average at least two hydroxyl functionalities.

Chemical precrosslinking in the sense of the present specification means the chemical crosslinking of polymers by means of crosslinker substances with a functionality of two or more, for the purpose of increasing the cohesion by means of chain extension reaction and intermolecular bridging of macromolecules of the polymer—or prepolymer—by chemical linking by means of the crosslinker molecules. Chemically precrosslinked products are pressure-sensitively adhesive but are no longer meltable, in each case in the sense of the definitions according to this specification, and have shear strength. Advantageously, in the static shear test under a shearing load of 500 g and with a bond area of 13×20 mm$^2$ on steel, they have holding times of greater than 10 000, preferably greater than 20 000 minutes.

By thermal vulcanization is meant in this text exclusively the sulfur vulcanization, in other words the crosslinking of unsaturated compounds, by means of sulfur, that is activated and performed by temperature increase.

A "meltable" substance or product for the purposes of this specification has a complex viscosity of at least 1000 Pas, preferably at least 2000 Pas, ideally at least 3000 Pas, as measured with a rheometer in an oscillation test under a sinusoidally oscillating shearing stress in a plate/plate arrangement, with a temperature of 23° C. and an oscillation frequency of 10.0 rad/s. At temperatures in the range between 40° C. and 100° C. and with an oscillation frequency of 10.0 rad/s, the complex viscosity is reduced down to less than 500 Pas, preferably down to less than 200 Pas, ideally down to less than 100 Pas. The oscillation frequency corresponds to the angular frequency.

The complex viscosity η* is defined as follows: η*=G*/ω (G*=complex shear modulus, ω=angular frequency).

The other definitions are as follows:

$$G^* = \sqrt{(G')^2 + (G'')^2}$$

(G"=viscosity modulus (loss modulus), G'=elasticity modulus (storage modulus)).

$G''=\tau/\gamma \cdot \sin(\delta)$ ($\tau$=shear stress, $\gamma$=deformation, $\delta$=phase angle=phase shift between shear stress vector and deformation vector).

$G'=\tau/\gamma \cdot \cos(\delta)$ ($\tau$=shear stress, $\gamma$=deformation, $\delta$=phase angle=phase shift between shear stress vector and deformation vector).

$\omega=2\pi \cdot f$ ($f$=frequency).

Pressure-sensitive adhesiveness is that property of a substance which enables it to enter into a durable bond to a substrate even under relatively weak applied pressure. Substances possessing this property are referred to as pressure-sensitive adhesives (PSAs). PSAs are long-established. Frequently they can be detached from the substrate again after use, substantially without residue. At room temperature, in general, PSAs have a permanent inherent adhesiveness, thus having a certain viscosity and tack, so that they wet the surface of the particular substrate even under low applied pressure. The capacity of a PSA to adhere to materials and to transmit forces derives from the adhesion capacity and the cohesion of the PSA.

PSAs may be viewed as liquids of extremely high viscosity with an elastic component. PSAs accordingly have particular, characteristic viscoelastic properties which result in the permanent inherent tack and adhesiveness.

A characteristic of PSAs is that when they are mechanically deformed, there are processes of viscous flow and there is also development of elastic forces of resilience. The two processes have a certain relationship to one another in terms of their respective proportion, in dependence not only on the precise composition, the structure and the degree of crosslinking of the respective PSA, but also on the rate and duration of the deformation and on the temperature.

The proportional viscous flow is necessary for the achievement of adhesion. Only the viscous components, brought about by macromolecules with relatively high mobility, permit effective wetting and flow onto the substrate where bonding is to take place. A high viscous flow component results in high tack (also referred to as surface stickiness) and hence often also in a high peel adhesion. Highly crosslinked systems, crystalline polymers, or polymers with glasslike solidification lack flowable components and are in general devoid of pressure-sensitive adhesiveness or at least possess only little pressure-sensitive adhesiveness.

The proportional elastic forces of resilience are necessary for the attainment of cohesion. They are brought about, for example, by very long-chain macromolecules with a high degree of coiling, and also by physically or chemically crosslinked macromolecules, and they permit the transmission of the forces that act on an adhesive bond. As a result of these forces of resilience, an adhesive bond is able to withstand a long-term load acting on it, in the form of a long-term shearing load, for example, to a sufficient extent over a relatively long time period.

For more precise description and quantification of the extent of elastic and viscous components, and also of the proportion of the components relative to one another, the variables of storage modulus (G') and loss modulus (G'') can be employed, and may be determined by means of Dynamic Mechanical Analysis (DMA). G' is a measure of the elastic component, G'' a measure of the viscous component, of a substance. The two variables are dependent on the deformation frequency and on the temperature.

The variables can be determined with the aid of a rheometer. In that case, for example, the material under investigation, in the form of a plane-parallel layer, is exposed in a plate/plate arrangement to a sinusoidally oscillating shearing stress. In the case of instruments operating with shear stress control, the deformation is measured as a function of time, and the time offset of this deformation relative to the introduction of the shearing stress is recorded. This time offset is referred to as phase angle $\delta$.

The storage modulus G' is defined as follows: $G'=(\tau/\gamma)^*\cos(\delta)$ ($\tau$=shear stress, $\gamma$=deformation, $\delta$=phase angle=phase shift between shear stress vector and deformation vector). The definition of the loss modulus G'' is as follows: $G''=(\tau/\gamma)^*\sin(\delta)$ ($\tau$=shear stress, $\gamma$=deformation, $\delta$=phase angle=phase shift between shear stress vector and deformation vector).

A substance and the layer produced from it are deemed in general to be pressure-sensitively adhesive, and are defined as pressure-sensitively adhesive for the purposes of this specification, if at room temperature, here by definition at 23° C., in the deformation frequency range from $10^0$ to $10^1$ rad/sec, G' is located at least partly in the range from $10^3$ to $10^7$ Pa and if G'' likewise is located at least partly within this range. Partly means that at least a section of the G' curve lies within the window formed by the deformation frequency range from $10^0$ (inclusive) up to $10^1$ (inclusive) rad/sec (abscissa) and also by the range of the G' values from $10^3$ (inclusive) to $10^7$ (inclusive) Pa (ordinate), and when at least a section of the G'' curve is likewise located within this window.

Within this region, which in a matrix plot of G' and G'' (G' plotted as a function of G'') may also be referred to as the viscoelastic window for PSA applications or as the PSA window according to viscoelastic criteria, there are in turn different sectors and quadrants which characterize more closely the PSA properties to be expected from the respectively associated substances. Within this window, substances with high G'' and low G' are notable, for example, in general for high peel adhesion and low shear strength, whereas substances with high G'' and high G' are notable both for high peel adhesion and for high shear strength.

Generally, the knowledge about the relationships between rheology and pressure-sensitive adhesiveness is state of the art and is described for example in Satas, Handbook of Pressure Sensitive Adhesive Technology, Third Edition, (1999), pages 153 to 203.

Polybutadiene-Polyurethane Prepolymer

The chemically precrosslinked product of the invention is based on an initially non-crosslinked polybutadiene-polyurethane prepolymer. This prepolymer is pressure-sensitively adhesive, meltable and hydroxyl-functionalized. The polybutadiene-polyurethane prepolymer is the reaction product of one or more polybutadiene-polyols—that is, of one or more polybutadiene-diols and/or one or more polyfunctional polybutadiene-polyols and/or one or more derivatives of polybutadiene-diols and/or polyfunctional polybutadiene-polyols—and optionally of one or more other polyols and/or derivatives thereof, especially chain extenders, with one or more aliphatic and/or alicyclic polyisocyanates—that is, isocyanates having an isocyanate functionality of two and/or isocyanates having an isocyanate functionality of three or greater than three.

In one advantageous embodiment, the meltable, pressure-sensitively adhesive, hydroxyl-functionalized polybutadiene-polyurethane prepolymer is the chemical reaction product of at least one polybutadiene-diol or polybutadiene-diol derivative, at least one chain extender having a hydroxyl functionality of two and a molar mass of less than or equal to 300 g/mol, and optionally at least one polybutadiene-polyol or polybutadiene-polyol derivative having a number-averaged average hydroxyl functionality between greater than 2.0 and less than or equal to 3.0, with at least one aliphatic or alicyclic diisocyanate and/or at least one aliphatic or alicyclic polyisocyanate having an isocyanate functionality of three or greater than three. The reactants and their proportions are selected more particularly such that the meltable, pressure-sensitively adhesive, hydroxyl-functionalized polybutadiene-polyurethane prepolymer at room temperature is sufficiently solid and dimensionally stable that it can be wound into a roll at room temperature on a release liner or on a carrier material, without running out of the side or being squeezed out by the pressure of winding, even when the chemical precrosslinking reaction is still not far enough advanced or concluded.

Commercial diols or polyhydric polyols are customary mixtures of polyols having different functionalities. The term "polybutadiene-diol" in this specification therefore encompasses all hydroxyl-functionalized mixtures—especially those available commercially—of polybutadiene-polyols whose number-averaged average hydroxyl functionality is two or somewhat less than two, but at least 1.5, preferably at least 1.8. The number-averaged average hydroxyl functionality of a polybutadiene-diol is in no way greater than two. Corresponding comments apply in respect of the polybutadiene-diol derivates.

The number-averaged average hydroxyl functionality is understood to be the average number of hydroxyl groups per molecule of a polyol. In this specification it is expressed relative to the number-averaged average molecular weight of the polyol in question, and is calculated according to the following formula:

$$f = M_n \text{ [g/mol]} \times \text{OHN [mmol OH/kg]}/10^6$$

f is the number-averaged average hydroxyl functionality. $M_n$ is the number-averaged average molecular weight of the respective polyol in the units [g/mol] and OHN is the hydroxyl number of the polyol in the units [mmol OH/kg].

The hydroxyl number is a measure of the amount of hydroxyl groups in a polyol.

The hydroxyl number is determined here according to DIN 53240. According to this method, the hydroxyl number (OHN) is expressed in the units [mg KOH/g]. It corresponds to the amount of KOH in [mg] which is equivalent to the amount of acetic acid bound in the acetylation of 1 g of polyol. For simplification of the formula calculations, the hydroxyl number in this specification is converted to the units [mmol OH/kg].

This is done according to the following formula:

$$\text{OHN [mmol OH/kg]} = \text{OHN [mg KOH/g]} \times 1000/56.1.$$

56.1 here is the molar mass of KOH.

The bonding of the hydroxyl groups of the polybutadiene-diols and -polyols to the polybutadiene chain may be primary or secondary. The butadiene units of the polybutadiene chain may be linked with one another in a 1,4 cis or trans form or in a 1,2 form with vinyl groups in the side chain, or in a mixed way. Polybutadiene-diols are prepared by anionic polymerization, whereas polybutadiene-polyols having a number-averaged average functionality of between greater than 2.0 and less than or equal to 3.0 are prepared by radical polymerization. Polybutadiene-diols are available commercially under the tradename Krasol®; polybutadiene-polyols having a number-averaged average functionality of between greater than 2.0 and less than or equal to 3.0 are available commercially under the tradename Poly Bd®, both products from the company Cray Valley.

By—hydroxyl-functionalized—polybutadiene derivates are meant substances derived from polybutadiene-polyols and possessing two or more C4 units, each possessing a carbon/carbon double bond, and also possessing, as well as hydroxyl groups, either additional functional groups such as epoxide groups, for example, or additional side chains such as vinyl groups, for example, or other additional structural elements.

Chain extenders in the sense of this specification are all hydroxyl-bearing compounds having a hydroxyl functionality of two and a molar mass of less than or equal to 300 g/mol. They carry no further isocyanate-reactive groups. They are therefore diols having a molar mass of less than or equal to 300 g/mol. It is known that many chain extenders used in the preparation of polyurethanes based on polyester-polyols or polyether-polyols are not compatible with polybutadiene-polyols. Separation occurs. Inventively preferred are the chain extenders that are compatible with polybutadiene-polyols. These are, for example, N,N-diisopropanolaniline (CAS No. 003077-13-2), 2,2,4-trimethyl-1,3-pentanediol (CAS No. 144-19-4) and 2-butyl-2-ethyl-1,3-propanediol (CAS No. 115-84-4). Particularly preferred is 2-ethyl-1,3-hexanediol (CAS No. 94-96-2). The knowledge about the chain extenders that are compatible with polybutadiene-polyols is part of the state of the art. It is published for example in Herbert Chao, Nan Tian, Cray Valley, USA, LLC, Exton, Pa., PCI, April 2010.

In order to achieve high pressure-sensitive adhesiveness (high tack) while at the same time avoiding excessive softness in the meltable pressure-sensitivity adhesive, hydroxyl-functionalized polybutadiene-polyurethane prepolymer, which would lead to reduced shear strength, it is advantageous if the numerical proportion of the hydroxyl groups introduced for forming the meltable, pressure-sensitivity adhesive, hydroxyl-fuctionalized that polybutadiene-polyurethane prepolymer originate from the at least one chain extender is between greater than or equal to 20.0% and less than or equal to 80.0%, preferably between greater than or equal to 30.0% and less than or equal to 70.0%. The numerical fraction always corresponds to the amount-of-substance fraction.

In order to achieve high pressure-sensitive adhesiveness (high tack) it is advantageous to use polybutadiene-polyols—that is, polyols having a number-averaged average functionality of between greater than 2.0 and less than or equal to 3.0 and/or polybutadiene-diols having a number-averaged average functionality between greater than 1.5, preferably 1.8 or more, and less than or equal to 2.0—with a number-averaged average molar mass of between greater than 1000 g/mol and less than 5000 g/mol, preferably between greater than or equal to 2000 g/mol and less than or equal to 3000 g/mol.

The polybutadiene-polyols having a number-averaged average functionality of between greater than 2.0 and less than or equal to 3.0 may be used optionally for producing the meltable, pressure-sensitively adhesive, hydroxyl-functionalized polybutadiene-polyurethane prepolymer, in order to incorporate branching sites into this prepolymer. A certain degree of branching would have the advantage of a higher degree of precrosslinking after the chemical reaction with the aliphatic or alicyclic diisocyanate and/or preferably the aliphatic or acyclic polyisocyanate having an isocyanate functionality of three or greater than three, and therefore of a greater shear strength on the part of the chemically precrosslinked, thermally vulcanizable pressure-sensitive adhesive of the invention.

If also using the optional polybutadiene-polyols having a number-averaged average functionality of between greater than 2.0 and less than or equal to 3.0 for producing the meltable, pressure-sensitivity adhesive, hydroxyl-functionalized polybutadiene-polyurethane prepolymer, it is necessary to ensure that no gelling occurs, in other words that the degree of branching in relation to the length of the prepolymer chains produced is not so high that there is already crosslinking during the prepolymer preparation. The degree of branching is set such as to ensure the meltability of the pressure-sensitively adhesive, hydroxyl-functionalized polybutadiene-polyurethane prepolymer, in other words such that no crosslinked structures are formed. In order to rule out crosslinked structures, it is mandatory not to exceed what is called the gel point. The theoretical gel point can be calculated using the gel point equation of P. J. Flory. A formula derived from the Flory equation and used for estimating the gelling NCO/OH ratio in reactions of polyurethane formation from diols and triols with diisocyanates in deficit reads as follows:

$$\left(\frac{\text{NCO}}{\text{OH}}\right)_{Gelling} = \frac{1}{1 + \frac{1}{\frac{(\text{Diol-OH})}{(\text{Triol-OH})} + 1}}$$

Diol-OH in this formula refers to the total number of hydroxyl groups involved in the polyurethane formation reaction and originating from polyols whose hydroxyl functionality is less than or equal to two. This also includes the chain extenders. Triol-OH refers to the total number of hydroxyl groups involved in the polyurethane formation reaction and bonded to polyols whose functionality is greater than two and less than or equal to three.

If the gelling NCO/OH ratio is reached or exceeded, there is a likelihood that crosslinked structures will form, and therefore that gelling will ensue. The formula provides only an approximate starting point, but nevertheless one which is generally sufficient for practical purposes, for determining the NCO/OH ratio at which gelling actually occurs.

Also using the optional aliphatic or alicyclic polyisocyanates having an isocyanate functionality of three or greater than three for producing the meltable, pressure-sensitively adhesive, hydroxyl-functionalized polybutadiene-polyurethane prepolymer, analogous considerations are valid correspondingly in order to prevent gelling. For this reason, the use ought also to be avoided both of polybutadiene-polyols having a number-averaged average functionality of between greater than 2.0 and less than or equal to 3.0 and at the same time of aliphatic or alicyclic polyisocyanates having an isocyanate functionality of three or greater than three for producing the meltable, pressure-sensitively adhesive, hydroxyl-functionalized polybutadiene-polyurethane prepolymer.

The numerical fraction of the hydroxyl groups introduced for forming the meltable, pressure-sensitively adhesive, hydroxyl-functionalized polybutadiene-polyurethane prepolymer and originating from the optional at least one polybutadiene-polyol having a number-averaged average functionality of between greater than 2.0 and less than or equal to 3.0 is advantageously not more than 50.0%, preferably between greater than or equal to 10.0% and less than or equal to 40.0%, more preferably between greater than or equal to 15.0% and less than or equal to 30.0%. Higher fractions require a disadvantageously low NCO/OH ratio which would result in a disadvantageously low softening temperature of the meltable, pressure-sensitively adhesive, hydroxyl-functionalized polybutadiene-polyurethane prepolymer.

The meltable, pressure-sensitively adhesive, hydroxyl-functionalized polybutadiene-polyurethane prepolymer is obtained by reaction of the stated polyols (diols and/or polyfunctional polyols) with at least one aliphatic or alicyclic diisocyanate and/or optionally at least one aliphatic or alicyclic polyisocyanate having an isocyanate functionality of three or greater than three.

Aliphatic or alicyclic diisocyanates are understood in this specification to be all organic polyisocyanates having an isocyanate functionality of two in which the isocyanate groups are not bonded directly to a ring system which is aromatic in accordance with Hûckels rule. Examples of aliphatic or alicyclic diisocyanates are butane 1,4-diisocyanate, tetramethoxybutane 1,4-diisocyanate, hexane 1,6-diisocyanate (hexamethylene diisocyanate, HDI), ethylene diisocyanate, 2,2,4-trimethylhexamethylene diisocyanate, ethylethylene diisocyanate, dicyclohexylmethane 4,4'-diisocyanate (H12MDI), 1,4-diisocyanatocyclohexane, 1,3-diisocyanatocyclohexane, 1,2-diisocyanatocyclohexane, 1,3-diisocyanatocyclopentane, 1,2-diisocyanatocyclopentane, 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)-cyclohexane, 1-isocyanato-2-(2-isocyanatoeth-1-yl)cyclohexane, 2-heptyl-3,4-bis(9-isocyanatononyl)-1-pentylcyclohexane, norbornane diisocyanatomethyl, m-tetramethylxylene diisocyanate (TMXDI) and also chlorinated, brominated, sulfer- or phosphorus-containing diiphatic or diicyclic diisocyanates. Particularly preferred are isophorone diisocyanate (CAS No. 4098-71-9) and dicyclohexylmethane 4,4'-diisocyanate (CAS No. 5124-30-1).

Aliphatic or alicyclic polyisocyanates having an isocyanate functionality of three or greater than three are, for example, trimerized or more highly oligomerized aliphatic or alicyclic diisocyanates, such as the trimeric, pentameric or more highly oligomerized HDI isocyanurates, included for example in the commercial products Desmodur N3300® or Desmodur N3600®, and also HDI biurets, included for example in Desmodur N100® or Desmodur N 3200®, the mixture of an HDI iminooxadiazinedione and an HDI isocyanurate in Desmodur XP 2410®, or the IPDI isocyanurate which is included in Desmodur Z 4470®, in each case from Bayer, and also derivatives of the recited polyisocyanates having an isocyanate functionality of three or greater than three, or mixtures thereof.

Also particularly suitable are mixtures of diisocyanates and (higher) polyisocyanates, for example dimeric HDI uretdione or allophanate group-comprising mixtures with fractions of higher-functionality polyisocyanates, as included in Desmodur N3400®, for example.

The alicyclic polyisocyanate having an isocyanate functionality of three or greater than three is preferably a trimerized or more highly oligomerized form of hexamethylene diisocyanate and/or isophorone diisocyanate.

The ratio of the total number of isocyanate groups to the total number of hydroxyl groups in the substances involved in the chemical reaction to give the meltable, pressure-sensitively adhesive, hydroxyl-functionalized polybutadiene-polyurethane prepolymer is always less than 1.0 and in one advantageous embodiment is greater than or equal to 0.3, preferably greater than or equal to 0.4, more preferably greater than or equal to 0.5, very preferably greater than or equal to 0.6. The preferred ratios are advantageous with regard to the attainment of a combination of firm consistency at room temperature with high pressure-sensitive adhesiveness or, in other words, the provision of viscoelastic, hydroxyl-functionalized hotmelt polyurethane prepolymers with high tack.

Preferably the meltable, pressure-sensitivity adhesive, hydroxyl-functionalized polybutadine-polyurethane prepolymer comprises the chemical reaction product of exclusively one or more polybutadiene-diols, optionally one or more polybutadiene-polyols having a number-averaged average functionality of between greater than 2.0 and less than or equal to 3.0, and one or more chain extenders having a hydroxyl functionality of two and a molar mass of less than or equal to 300 g/mol with one or more aliphatic or alicyclic diisocyanates and/or optionally one or more aliphatic or alicyclic polyisocyanates having an isocyanate functionality greater than three. Preferably, therefore, there are no additional, other polyols or isocyanates involved in the chemical reaction to give the meltable, pressure-sensitively adhesive, hydroxyl-functionalized polybutadiene-polyurethane prepolymer, and more particularly no polyether-polyols, no polyester-polyols and no aromatic diisocyanates. It is assumed that when the meltable, pressure-sensitively adhesive, hydroxyl-functionalized polybutadiene-polyurethane prepolymer is used as a base elastomer in the production of a chemically precrosslinked thermally vulcanizable pressure-sensitive adhesive, polyether-polyols and polyester-polyols have disadvantageous consequences for the adhesion properties after the vulcanization reaction, especially for the adhesion properties on oiled metal sheets. It is further assumed that aromatic diisocyanates are disadvantageous for the adhesiveness (the tack).

To accelerate the reaction, the chemical conversion to form the meltable, pressure-sensitively adhesive, hydroxyl-functionalized polybutadiene-polyurethane prepolymer takes place preferably with addition of a catalyst. It is possible to use one or more catalysts known to the skilled person, such as, for example, tertiary amines, organobismuth or organotin compounds, to name but a few. Very advantageously it is possible to use catalysts comprising bismuth and carbon, preferably a bismuth carboxylate or a bismuth carboxylate derivative. Particularly advantageous is bismuth trisneodecanoate (CAS No. 34364-26-6).

The concentration of the catalysts is tailored to the desired reaction rate and is situated typically at between 0.01 wt % and 0.5 wt % of the meltable, pressure-sensitively adhesive, hydroroxyl-functionalized polybutadiene-polyurethane prepo to be prepared.

The meltable, pressure-sensitively adhesive, hydroxyl-functionalized polybutadiene-polyurethane prepolymer is preferably prepared without the use of solvents. Including solvents in the production operation, while readily possible technically, does not normally bring any advantages.

The meltable, pressure-sensitively adhesive, hydroxyl-functionalized polybutadiene-polyurethane prepolymer is advantageously produced batchwise, in other words discontinuously, for example in a heatable mixing vessel, kneading apparatus, planetary mixer or dissolver. In order to achieve absence of bubbles, mixing takes place in the end phase of the operation, when the chemical reaction is largely concluded, preferably under reduced pressure.

Blending with Isocyanates, Sulfur and Further Components

For the precrosslinking, the prepolymer is admixed with one or more aliphatic and/or alicyclic polyisocyanates (with functionality of two and/or more). This is done usually into the melted prepolymer. The addition of the polyisocyanates is accompanied by the commencement of reaction with the hydroxyl groups of the prepolymer—that is, the precrosslinking reaction.

In particular prior to the precrosslinking, hence prior to the addition of the polyisocyanates, the further constituents of the later PSA are added to the prepolymer, such as, in particular, the sulfur used for the vulcanization, vulcanization accelerators optionally present, and other substances/additives optionally present. With particular advantage, these further substances/additives are also mixed into the melt of the prepolymer.

Alternatively, these further formulating constituents—such as, for example, sulfur, fillers, microspheres, resins, especially tackifying hydrocarbon resins, plasticizers, ageing inhibitors (antioxidants), light stabilizers, UV absorbers, rheological additives and also other auxiliaries and adjuvants—may be added simultaneously with the polyisocyanates and/or during the continuous mixing of the pressure-sensitively adhesive, hydroxyl-functionalized polybutadiene-polyurethane prepolymer with the polyisocyanates.

The polyisocyanates may be added continuously or batchwise. The reaction of the meltable, pressure-sensitively adhesive, hydroxyl-functionalized polybutadiene-polyurethane prepolymer with the polyisocyanates may also take place either continuously or batchwise.

Likewise, the metered addition of the sulfur and of the optional vulcanization accelerators, fillers, and the other substances may take place either continuously or batchwise.

The term "continuously" relates to the process regime and means that during the mixing, the substances to be mixed are supplied continually and in particular at a uniform rate to the mixing assembly, being thus introduced into that assembly, and the mixture—in which, if the isocyanates have already been added, the gradual chemical reaction to give the chemically precrosslinked, pressure-sensitively adhesive polybutadiene-polyurethane is initiated by the mixing and then proceeds—leaves the mixing assembly at another point continually and in particular at a uniform rate. During the mixing, therefore, there is a continual, in particular uniform, flow procedure and/or transport procedure within the mixing assembly. The residence time of the substances in the mixing assembly from their introduction until they leave in the form of a chemically reacting mixture (in particular, then, the reaction time of the meltable, pressure-sensitively adhesive, hydroxyl-functionalized polybutadiene-polyurethane prepolymer with the aliphatic or alicyclic diisocyanate and/or more preferably with the aliphatic or alicyclic polyisocyanate having an isocyanate functionality of three or greater than three, prior to shaping) preferably does not exceed 10 minutes and very preferably amounts to 2 seconds to 5 minutes.

A continuous process regime is especially appropriate when the reaction between the meltable, pressure-sensitively adhesive, hydroxyl-functionalized polybutadiene-polyurethane prepolymer and the polyisocyanates is initiated in the melt (in particular, then, without solvent).

In a supplement to the definition already provided, a meltable, pressure-sensitively adhesive, hydroxyl-functionalized polybutadiene-polyurethane prepolymer is considered as melted in this specification when the viscosity has been lowered, by means of an increase in the temperature of the meltable, pressure-sensitively adhesive, hydroxyl-functionalized polybutadiene-polyurethane prepolymer to an extent such that it can be mixed homogeneously with the polyisocyanates in known mixing assemblies. This increase in the temperature of the meltable, pressure-sensitively adhesive, hydroxyl-functionalized polybutadiene-polyurethane prepolymer may be generated by heating from outside or by shearing. Known mixing assemblies are, for example, kneading apparatus, internal mixers, extruders, planetary roller extruders, annular extruders, planetary mixers, butterfly mixers or dissolvers.

The continuous mixing of the melted, pressure-sensitively adhesive, hydroxyl-functionalized polybutadiene-polyurethane prepolymer with the polyisocyanates and also with the sulfur and the optional vulcanization accelerators, fillers and also the further substances preferably takes place solventlessly in a continuous mixing assembly, preferably in an extruder, more particularly a twin-screw, planetary roller or annular extruder, or in a heatable two-component mixing and metering unit. Cascading circuits made up of continuous or else discontinuous mixing assemblies are likewise suitable. The design of the mixing assembly is preferably such as to ensure effective comixing in a short residence time in the mixing assembly. The addition of the melted, pressure-sensitively adhesive, hydroxyl-functionalized polybutadiene-polyurethane prepolymer and of the polyisocyanates in an extruder may be made at the same location or else at different locations, preferably in unpressurized zones. It is useful if the polyisocyanates are added in finely divided form to the pressure-sensitively adhesive, hydroxyl-functional polybutadiene-polyurethane prepolymer, as an aerosol or in fine droplets, for example.

Sulfur and Further Substances and/or Additives

As already mentioned, the metering of the sulfur and of the optional vulcanization accelerators, fillers and also further adjuvants and additives may take place either continuously or batchwise.

The continuous mixing of the melted, pressure-sensitively adhesive, hydroxyl-functionalized polybutadiene-polyurethane prepolymer with the sulfur and with the optional vulcanization accelerators, fillers and also the further substances also takes place preferably solventlessly in a continuous mixing assembly, preferably in an extruder, more particularly a twin-screw, planetary roller or annular extruder, or a heatable two-component mixing and metering unit, if these substances/additives are admixed before the isocyanates. Cascaded circuits composed of continuous or else discontinuous mixing assemblies are likewise suitable. The design of the mixing assembly is preferably such that it ensures effective comixing in a short residence time in the mixing assembly.

For the later vulcanization, ground sulfur is used. Ground sulfur is soluble or insoluble, ground, elemental sulfur. The degree of purity ought to be at least 95%, more preferably at least 99%. The sulfur ought to be ground finely enough that the sieve residue for a mesh size of 100 µm is not more than 2%. Coarser grades do also operate in principle, but may result in the adhesive then possessing a roughness which can be distinctly perceived visually, and in somewhat lower attainable bond strengths.

The PSA optionally comprises one or more vulcanization accelerators, one or more fillers, one or more epoxy resins, one or more tackifier resins, bitumen, one or more plasticizers, one or more oils, one or more ageing inhibitors, one or more further auxiliaries and adjuvants, or any desired combinations of the aforesaid substances/additives, which are admixed in each case in particular to the melted prepolymer.

Of the optional substance classes of the vulcanization accelerators, fillers, epoxy resins, tackifier resins, bitumen, plasticizers, oils, ageing inhibitors, and also the further auxiliaries and adjuvants, it is possible in each case for only one or any desired combination of two or more classes of substance to be present. Within a class of substance, also, there may be in each case one substance or any arbitrary number of different substances present.

In order to activate the sulfur vulcanization, it is possible to add vulcanization accelerators and vulcanization auxiliaries and adjuvants. These substances lower the activation temperature and/or accelerate curing and crosslinking. Vulcanization accelerators which may be present optionally in the adhesive of the invention are understood in this specification to be all substances which are known to accelerate vulcanization. They may at the same time also be sulfur donors. The concept of the invention also embraces those known sulfur donors which in the technical literature are not explicitly also classified simultaneously as accelerators.

The most important vulcanization accelerators may be ordered in the following known classes of substance: mercapto accelerators, sulfenamide accelerators, sulfenimide accelerators, thiuram accelerators, dithiocarbamate accelerators, dithiocarbamylsulfenamide accelerators, xanthogenate accelerators, guanidine accelerators, amine accelerators, thiourea accelerators, dithiophosphate accelerators, and sulfur donors. Examples of mercapto accelerators are 2-mercaptobenzothiazole (MBT), zinc 2-mercaptobenzothiazole (ZMBT) and dibenzothiazyl disulfide (MBTS). Typical sulfenamide accelerators are N-cyclohexyl-2-benzothiazolesulfenamide (CBS), N-tert-butyl-2-benzothiazolesulfenamide (TBBS), N-oxydiethylene-2-benzothiazolesulfenamide (MBS) and N,N'-dicyclohexyl-2-benzothiazolesulfenamide (DCBS). An example of a sulfenimide accelerator is N-tert-butyl-2-benzothiazolesulfenimide. Examples of thiuram accelerators are tetramethylthiuram monosulfide (TMTM), tetramethylthiuram disulfide (TMTD), tetraethylthiuram disulfide (TETD), tetrabenzylthiuram disulfide (TBzTD), tetraisopropylthiuram disulfide (TiPTD), dimethyldiphenylthiuram disulfide (MPTD) and dipentamethylenethiuram tetrasulfide (TPTT). Zinc dimethyldithiocarbamate (ZDMC), zinc diethyldithiocarbamate (ZDEC), zinc dibutyldithiocarbamate (ZDBC), zinc pentamethylenedithiocarbamate (Z5MC), zinc ethylphenyldithiocarbamate (ZEPC), zinc dibenzyldithiocarbamate (ZBEC), zinc diisopropyldithiocarbamate (ZDIPC), piperidine pentamethylenedithiocarbamate (PPC), tellurium dimethyldithiocarbamate (TDMC), tellurium diethyldithiocarbamate (ZDEC), lead dimethyldithiocarbamate (PbDMC), copper dimethyldithiocarbamate (CuDMC), copper dibutyldithiocarbamate (CuDBC), bismuth dimethyldithiocarbamate (BiDMC) and sodium dimethyldithiocarbamate (NaDMC) represent a selection of known dithiocarbamate accelerators. Typical dithiocarbamylsulfenamide accelerators are N-oxydiethylenedithiocarbamyl-N'-oxydiethylenesulfenamide (OTOS) and N-oxydiethylenedithiocarbamyl-N'-tert-butylsulfenamide (OTTBS). Known examples of xanthogenate accelerators are zinc isopropylxanthogenate (ZIX), zinc butylxanthogenate (ZBX), sodium isopropylxanthogenate (NaIX) and polyxanthogenate. Typical guanidine accelerators are diphenylguanidine (DPG), di-o-tolylguanidine (DOTG) and o-tolyl biguanide (OTBG). Amine accelerators are, for example, butyraldehydeaniline (BAA), tricrotonylidenetetramine (TCT), hexamethylenetetramine (HEXA), polyethylenepolyamines (PEP) and cyclohexylethylamine (CEA). N,N'-ethylenethiourea (ETU), N,N'-dibutylthiourea (DBTU), N,N'-diethylthiourea (DETU) and N,N'-diphenylthiourea (DPTU) are examples of thiourea accelerators. Known dithiophosphate accelerators are zinc dibutyldithiophosphate (ZBPD), zinc diisooctyldithiophosphate (ZOPD), dodecylammonium diisooctyldithiophosphate (AOPD) and copper diisopropyldithiophosphate (CuPPD). Sulfur donors include 2-morpholinodithiobenzothiazole (MBSS), N,N'-dithiodimorpholine (DTDM) and caprolactam disulfide (CLD).

The knowledge about vulcanization accelerators, generally, is state of the art and is set out for example in Werner Hoffmann, Heinz Gupta, Handbuch der Kautschuk-Technologie (2001).

Preferred classes of substance are mercapto accelerators, thiuram accelerators and dithiocarbamate accelerators. Mercapto accelerators are regarded as "all-purpose" accelerators, which ensure rapid vulcanization and have no adverse effect on the stability of the as yet unvulcanized adhesive in the temperature range from 160° C. to 180° C. The thiuram accelerators and dithiocarbamate accelerators, individually or in combination, or else in combination with the mercapto accelerators, are regarded as "ultra-accelerators", which ensure rapid vulcanization even at temperatures from 130° C. upwards and which nevertheless ensure sufficient stability during the production of the adhesive, even in the case of compounding temperatures of up to around 90° C., and during subsequent storage at temperatures between room temperature and 30° C. A preferred "all-purpose" vulcanization accelerator is MBTS. Preferred "ultra-accelerators" are TBzTD and ZBEC. In addition to considerations of technical functionality, another factor in the selection is the safety aspect with regard to the possible release of hazardous, carcinogenic cleavage products, especially carcinogenic N-nitrosamines. In this regard, MBTS, TBzTD and ZBEC are considered not to be critical.

Preferred concentrations of the vulcanization accelerators in the chemically precrosslinked, thermally vulcanizable, pressure-sensitive adhesive amount together to between at least 0.1 weight percent and not more than 15.0 weight percent, preferably between at least 0.5 and not more than 12.5 weight percent, more preferably between at least 1.0 and not more than 10.0 weight percent.

In order to accelerate the vulcanization further, it is also possible as required for vulcanization auxiliaries and additives to be added, such as, for example, metal oxides, especially zinc oxide, fatty acids, such as stearic acid, for example, or salts thereof. With regard to the stability of the as yet unvulcanized chemically precrosslinked pressure-sensitive adhesive and with regard to the adhesion properties after vulcanization, particularly on oiled metal sheets, the use of vulcanization auxiliaries and additives has proved to be rather critical, and so preferred embodiments are free from these substances.

As fillers, which may likewise be included optionally, it is possible to use not only reinforcing fillers, such as carbon black, for example, but also non-reinforcing fillers, such as carbonates, for example, especially chalk, or sulfates such as barium sulfate, for example. Other examples of fillers that are contemplated are silicates, such as talc, kaolin, calcined or partly calcined kaolin, wollastonites or micas, hydroxides or oxides, such as finely ground quartz, for instance, aluminium hydroxide, zinc oxide or calcium oxide. Microspheres are also contemplated as fillers. Microspheres may be solid glass microspheres, hollow glass microspheres and/or polymeric microspheres of all kinds. The polymeric microspheres may be in unexpanded or pre-expanded form. The particle size in the expanded state is usually in the range between 20 and 150 µm. Mixtures of the substances stated may also be used. In particular, mixtures of calcium oxide and chalk, talc and/or kaolin have proved to be particularly advantageous in respect of the attainment of high bond strengths and in respect of the minimization of occasional blistering during the thermal vulcanization. Advantageous weight fractions of ground in the calcium oxide chemically precrosslinked, thermally vulcanizable pressure-sensitive adhesive amount to between 5.0 and 30.0 percent by weight, preferably between 10.0 and 20.0 percent by weight. Advantageous weight fractions of ground chalk, ground talc and/or ground kaolin in the chemically precrosslinked, thermally vulcanizable pressure-sensitive adhesive amount together to between 10.0 and 50.0 percent by weight, preferably between 20.0 and 40.0 percent by weight.

The pressure-sensitive adhesive may optionally comprise epoxy resins. The term "epoxy resin" here refers to synthetic resins which carry epoxide groups. Advantageous are bisphenol-based epoxy resins, especially those based on bisphenol A, but also those based on bisphenol F. Particularly advantageous is an epoxy resin which is liquid at room temperature, especially the reaction product of bisphenol A and epichlorohydrin that has a number-averaged, average molecular weight of less than or equal to 700 g/mol (CAS No. 25068-38-6), but also corresponding solid reaction products having higher number-averaged average molecular weights are optional epoxy resins. Other advantageous epoxy resins are epoxyphenol-novolac resins, epoxydicyclopentadiene-phenol-novolac resins, epoxycresol-novolac resins, glycidylamine-based epoxy resins, especially triglycidyl ethers of para-aminophenol, triglycidyl ethers of meta-aminophenol, tetraglycidyl ethers of methylenedianiline, hydroxyphenyl-based epoxy resins, and aliphatic epoxy resins, especially those which are cycloaliphatic. Particularly noteworthy here is 3,4-epoxycyclohexylmethyl 3',4'-epoxycyclohexanecarboxylate (CAS No. 2386-87-0).

An advantageous concentration of the epoxy resin in the chemically precrosslinked thermally vulcanizable pressure-sensitive adhesive is between 1.0 wt % (inclusive) and 20 wt % (inclusive). Particularly advantageous is a concentration between 5.0 wt % (inclusive) and 15.0 wt % (inclusive). The addition of epoxy resins has emerged as being advantageous particularly in respect of the adhesion properties of the chemically precrosslinked, thermally vulcanizable pressure-sensitive adhesive on metal surfaces after the thermal vulcanization reaction. Moreover, the viscosity of the compound during the production of the adhesive is lowered advantageously, allowing operation to take place at lower process temperatures.

The epoxy resin as well can in principle be admixed to the melted prepolymer. However, the chemical conversion to form meltable pressure-sensitively adhesive, hydroroxyl-functionalized polybutadiene-polyurethane prepolymer advantageously takes place already in the presence of the optional at least one epoxy resin. The advantage of this process is that the at least one epoxy resin can be incorporated in an energy-saving manner, at room temperature. If, alternatively, the polybutadiene-polyurethane were to be prepared first, and then the at least one epoxy resin added, it would be necessary to heat the polybutadiene-polyurethane prepolymer first of all to a temperature in which it was present as a melt. The disadvantage of that would be the need for a higher energy input. A further advantage is that the softening or melting temperature of the mixture of prepolymer and epoxy resin is significantly lower than the softening or melting temperature of the pure prepolymer, but with the hotmelt character still retained. Subsequent compounding with sulfur and other substances, such as vulcanization accelerators, for example, can therefore take place in an energy-saving manner, and gently, at lower temperatures than without the epoxy resin already incorporated during polybutadiene-polyurethane prepolymer preparation. In this way, compounding with so-called ultra-accelerators, which occasionally cause onset of vulcanization even at approximately 120° C. within a few minutes, is also possible without any unwanted instances of curing or gelling during the compounding operation. If the subsequent compounding of the polybutadiene-polyurethane with sulfur, vulcanization accelerators and vulcanization auxiliaries and additives takes place in a continuously operating mixing assembly, more particularly in a compounding extruder, a further advantage is that none of the generally limited range of available metering points in the compounding extruder would be blocked by the at least one epoxy resin.

The fact that it is technically possible for the isocyanate-based chemical conversion forming the meltable, pressure-sensitively adhesive, hydroxyl-functionalized polybutadiene-polyurethane prepolymer to take place in the presence of one or more epoxy resins is surprising for the skilled person, since isocyanates are described in the technical literature as being reactive towards epoxides, as for example in Ullmann's Encyclopaedia of Industrial Chemistry, 6th Edition, Vol. 12, page 271 (table) and in Encyclopaedia of Polymer Science and Engineering, Vol. 6, page 345.

Surprisingly it has been found, moreover, that mixtures of epoxy resin and the pressure-sensitively adhesive, hydroxyl-functionalized polybutadiene-polyurethane prepolymer tend towards phase separation if the at least one epoxy resin is mixed in only after the preparation of the pressure-sensitively adhesive, hydroxyl-functionalized polybutadiene-polyurethane prepolymer. If, on the other hand, the chemical conversion to give the pressure-sensitivity adhesive, hydroxyl-functionalized polybutadiene-polyurethane prepolymer takes place in the presence of the epoxy resin/epoxy resins, the resulting mixtures are in fact generally cloudy, depending on the mixing ratio, but do not separate, and have the advantage of vulcanizing (curing) homogeneously, thereby allowing higher strength and better adhesion to be achieved than when using an inhomogeneous mixture of pressure-sensitively adhesive, hydroxyl-functionalized polybutadiene-polyurethane prepolymer and epoxy resin. Similarly, other substances as well, such as plasticizers, oils, tackifier resins, bitumen or else fillers or rheological additives, for example, may be added even before or during the chemical conversion to give the meltable, pressure-sensitively adhesive, hydroxyl-functionalized polybutadiene-polyurethane prepolymer.

The chemically precrosslinked, thermally vulcanizable pressure-sensitive adhesive may optionally also comprise tackifier resins. The term "tackifier resin" is understood by the skilled person to refer to a resin-based substance which increases the tack. Tackifier resins can be divided into natural resins and synthetic resins.

Typical natural resins are rosin-based resins and their derivatives. Rosins include, for example, natural rosin, polymerized rosin, partially hydrogenated rosin, fully hydrogenated rosin, esterified products of these types of rosin (such as glycerol esters, pentaerythritol esters, ethylene glycol esters and methyl esters) and rosin derivatives (such as disproportionation rosin, fumaric acid-modified rosin and lime-modified rosin).

Typical synthetic resins are polyterpene resins, although the raw materials here originate from natural sources; hydrocarbon resins and terpene-phenolic resins. These are polymers of low molecular weight. The weight-averaged average molecular weight is generally less than 25 000 g/mol.

Polyterpene resins are based on $\alpha$-pinene and/or $\beta$-pinene and/or $\delta$-limonene. They may be hydrogenated, non-hydrogenated or partially hydrogenated.

Raw materials for the majority of hydrocarbon resins are by-products obtained in the cracking of naphtha or gas-oil. Hydrocarbon resins may be classified according to whether they are based primarily on aromatic, aliphatic or diene monomers. Aromatic resins are often referred to as C-9 resins, aliphatic resins as C-5 resins, and diene resins as $(C-5)_2$ resins. Mixed aromatic-aliphatic hydrocarbon resins ((C-5/C-9) resins) are likewise included by the concept of the invention. Hydrocarbon resins as well may be hydrogenated, non-hydrogenated or partially hydrogenated.

Further included in the concept of the invention are monomer resins of the styrene/$\alpha$-methylstyrene type (CAS No.: 9011-11-4). Terpene-phenolic resins, according to DIN 16916-1 1981-06 and ISO/TR 8244:1988, are resins produced by acid-catalysed addition reaction of phenols with terpenes or rosin.

Tackifier resins preferred in accordance with the invention are polyterpene resins based on $\alpha$-pinene and/or $\beta$-pinene and/or $\delta$-limonene. Especially preferred are $\beta$-pinene resins (CAS No.: 25719-60-2), an example being the resin Dercolyte S-115 from DRT.

Advantageous concentrations of the tackifier resins in the chemically precrosslinked, thermally vulcanizable pressure-sensitive adhesive are between 1.0 (inclusive) wt % and 30.0 (inclusive) wt %. Particularly advantageous are concentrations between 5.0 (inclusive) wt % and 20.0 (inclusive) wt %. The addition of tackifier resins has emerged as being advantageous particularly with regard to the adhesion properties of the chemically precrosslinked, thermally vulcanizable pressure-sensitive adhesive on oiled metal sheets prior to the thermal vulcanization reaction. The peel adhesion of the as yet unvulcanized PSA on oiled metal sheets can be increased significantly in this way.

The chemically precrosslinked, thermally vulcanizable pressure-sensitive adhesive may optionally further comprise bitumen. Bitumen is a dark-coloured, high-molecular-mass hydrocarbon mixture which is semi-solid to springingly hard and which is obtained as a residue in the distillation of suitable petroleum, further containing chemically bonded sulfur, oxygen, nitrogen and certain traces of metals. In physical terms, bitumen is among the thermoplastics, meaning that its properties are temperature-dependent. On cooling, it becomes brittle; on heating, it passes steplessly through all of the states from solid via highly viscous to highly mobile. Distinctions are made between, among others, the following bitumen varieties and derived products: roadbuilding bitumen, especially soft bitumen, modified bitumen, especially polymer-modified bitumen, industrial bitumen, especially oxidation bitumen or hard bitumen, flux bitumen, and bitumen emulsion.

Preferred in accordance with the invention is roadbuilding bitumen. Particularly preferred is the 50/70 grade, the numbers indicating the minimum and maximum penetration at 25° C. in the units of mm/10 in accordance with DIN EN 1426. Advantageous concentrations of bitumen in the chemically precrosslinked, thermally vulcanizable pressure-sensitive adhesive are between 1.0 (inclusive) wt % and 30.0 (inclusive) wt %. Particularly advantageous are concentrations of between 5.0 (inclusive) wt % and 20.0 (inclusive) wt %. The addition of bitumen allows an improvement in the oil absorption when bonding takes place to oiled metal sheets.

The chemically precrosslinked, thermally vulcanizable pressure-sensitive adhesive may optionally further comprise plasticizers. Plasticizers are liquid or solid, inert organic substances of low vapour pressure, primarily of ester-like type, which interact physically with high-polymer substances, without chemical reaction, preferably by virtue of their solvency and swelling capacity, but in some cases even without such behaviour, and which are able to form a homogeneous system with said high-polymer substances. The abbreviated designations of plasticizers are regulated in DIN EN ISO 1043-3: 2000-01. The most important plasticizers can be divided into larger groups, which are listed below, with the abbreviated code of DIN EN ISO 1043-3: 2000-01 being given in parentheses.

Phthalic esters, also called phthalates for short, include, among others, dioctyl phthalate (DOP; di(2-ethylhexyl) phthalate), diisononyl phthalate (DINP), diisodecyl phthalate (DIDP), phthalic esters with predominantly linear $C_6$ to $C_{11}$ alcohols, dibutyl phthalate (DBP), diisobutyl phthalate (DIBP), dicyclohexyl phthalate (DCHP), dimethyl phthalate (DMP) and diethyl phthalate (DEP), and also mixed esters, comprising benzyl (butyl) phthalate (BBP), butyl octyl phthalate, butyl decyl phthalate and dipentyl phthalate, bis(2-methoxyethyl) phthalate and dicapryl phthalate (DCP).

An example of trimellitic esters with (predominantly) linear $C_6$ to $C_{11}$ alcohols is tris(2-ethylhexyl) trimellitate (TOTM).

Acyclic aliphatic dicarboxylic esters are, for example, esters of adipic acid such as bis(2-ethylhexyl) adipate (dioctyl adipate, DOA), bis(8-methylnonyl) adipate (diisodecyl adipate, DIDA), dibutyl decanedioate (dibutyl sebacate, DBS), bis(2-ethylhexyl) decanedioate (dioctyl sebacate, DOS). An example of a cyclic aliphatic dicarboxylic ester is diisononyl 1,2-cyclohexanedicarboxylate (DINCH).

Examples of polymer plasticizers are polyesters of adipic, decanedioic, nonanedioic and phthalic acid with diols such as butane-1,3-diol, propane-1,2-diol, butane-1,4-diol, hexane-1,6-diol and others ($M_r$ about 1800-13 000 g/mol).

Phosphoric esters, called phosphates for short, are a further group. Mention may be made here, by way of example, of tricresyl phosphate (TCF), triphenyl phosphate (TPP), diphenyl cresyl phosphate (DPCF), 2-ethylhexyl diphenyl phosphate (diphenyl octyl phosphate, DPOF), tris (2-ethylhexyl) phosphate (TOF) and tris(2-butoxyethyl) phosphate.

Butyl oleate or butyl stearate are examples of fatty acid esters, which represent a further group. Further examples of this group are methyl esters and butyl esters of acetylated ricinoleic fatty acid and fatty acid glycol esters and also triethylene glycol bis(2-ethylbutyrate).

Citric esters are examples of the group of hydroxycarboxylic esters. Further examples are tartaric esters and lactic esters.

A further group of plasticizers are epoxy plasticizers, as for example epoxidized fatty acid derivatives, especially triacyl glycerols and monoesters. Certain of the aforementioned epoxy resins as well may be classed within the group of the plasticizers. Mention may further be made of polyamide plasticizers, as for example benzenesulfonamides or methylbenzenesulfonamides. Another group of plasticizers are alkylsulfonic esters of phenol (ASE). Mineral oils as well may be considered within the context of the present specification to be plasticizers. Naphthenic mineral oils are preferred. The bitumen as well, already listed separately, could be classed under the heading of the plasticizers.

In one optional embodiment, the chemically precrosslinked, thermally vulcanizable pressure-sensitive adhesive comprises further auxiliaries and adjuvants such as, for example, rheological additives, ageing inhibitors (antioxidants), light stabilizers or UV absorbers. Examples of rheological additives are pyrogenic, hydrophobized or non-hydrophobized silicas, phyllosilicates (bentonites), high molecular mass polyamide powders or castor oil derivative powders. The stated rheological additives may also be classed under the heading of fillers. The suitable antioxidants include, for example, sterically hindered phenols, especially pentaerythritol tetrakis(3-(3,5-di-tert-butyl-4-hydroxyphenyl)propionate) (CAS number: 6683-19-8), hydroquinone derivatives, amines, organic sulfur compounds or organic phosphorus compounds.

Light stabilizers employed are, for example, the compounds disclosed in Gaechter and Müller, Taschenbuch der Kunststoff-Additive, Munich 1979, in Kirk-Othmer (3rd) 23, 615 to 627, in Encycl. Polym. Sci. Technol. 14, 125 to 148 and in Ullmann (4.) 8, 21; 15, 529, 676.

Precrosslinking

The meltable, pressure-sensitively adhesive, hydroxyl-functionalized polybutadiene-polyurethane prepolymer is chemically precrosslinked in accordance with the invention. The chemical precrosslinking (first chemical crosslinking) takes place preferably by chemical conversion of the meltable, pressure-sensitively adhesive, hydroxyl-functionalized polybutadiene-polyurethane prepolymer with one or more aliphatic or alicyclic polyisocyanates. Aliphatic or alicyclic polyisocyanates here are the same isocyanates with a functionality of two or more as already elucidated in connection with the description of the production of the meltable, pressure-sensitively adhesive, hydroxyl-functionalized polybutadiene-polyurethane prepolymer.

For the precrosslinking, preference is given to using—in particular predominantly or exclusively—aliphatic and/or alicyclic polyisocyanates having an isocyanate functionality of three or greater than three.

The ratio of the total number of isocyanate groups introduced in the production of the chemically precrosslinked, thermally vulcanizable PSA to the total number of hydroxyl groups introduced in the production is advantageously between greater than or equal to 0.5 and less than or equal to 1.3, preferably between greater than or equal to 0.6 and less than or equal to 1.2, more preferably between greater than or equal to 0.7 and less than or equal to 1.1, very preferably between greater than or equal to 0.8 and less than or equal to 1.0. The total number of the respective functional groups introduced in the production of the chemically precrosslinked, thermally vulcanizable PSA is based on the sum total of the respective functional groups introduced for producing the prepolymer and for its precrosslinking.

As already mentioned, the reaction of the meltable, pressure-sensitively adhesive, hydroxyl-functionalized polybutadiene-polyurethane prepolymer with the aliphatic or alicyclic diisocyanate and/or more preferably with the aliphatic or alicyclic polyisocyanate having an isocyanate functionality of three or greater than three may take place either continuously or batchwise. The sulfur and the optional vulcanization accelerators, fillers and also the further substances may be metered in before, concurrently with the isocyanates or after addition of the isocyanates, into the reaction system.

In the case of the continuous process regime—as defined above—during the admixing of the polyisocyanates, the gradual chemical reaction to form the chemically precrosslinked, pressure-sensitively adhesive polybutadiene-polyurethane is initiated by the mixing and then proceeds. As mentioned, the continuous mixing of the melted, pressure-sensitively adhesive, hydroxyl-functionalized polybutadiene-polyurethane prepolymer with the polyisocyanates—and also, optionally concurrently, with the sulfur and the optional vulcanization accelerators, fillers and also the further substances—takes place preferably solventlessly in a continuous mixing assembly, preferably in an extruder, more particularly in a twin-screw, planetary roller or annular extruder, or in a heatable two-component mixing and metering unit. Cascaded circuits composed of continuous or discontinuous mixing assemblies are likewise suitable. The design of the mixing assembly is preferably such that effective commixing is ensured in a short residence time in the mixing assembly. In an extruder, the melted, pressure-sensitively adhesive, hydroxyl-functionalized polybutadiene-polyurethane prepolymer and the polyisocyanates may be added at the same location or else at different locations, preferably in unpressurized zones. It is useful if the polyisocyanates are added in finely divided form—as aerosol or in fine droplets, for example—to the pressure-sensitively adhesive, hydroxyl-functionalized polybutadiene-polyurethane prepolymer.

The pressure-sensitively adhesive, hydroxyl-functionalized polybutadiene-polyurethane prepolymer may also be heated in a two-component mixing and metering unit and conveyed in heated form in the melted state as component A, while the polyisocyanates are conveyed as component B. Continuous commixing then takes place in a dynamic mixing head or, preferably, in a static mixing tube, or in a combination of dynamic and static mixing procedures.

As already stated, it is possible optionally during the continuous commixing of the pressure-sensitively adhesive, hydroxyl-functionalized polybutadiene-polyurethane prepolymer in the melt with the polyisocyanates for further formulating constituents to be admixed, such as, for example, sulfur, fillers, microspheres, resins, especially tackifying hydrocarbon resins, plasticizers, ageing inhibitors (antioxidants), light stabilizers, UV absorbers, rheological additives, and also other auxiliaries and adjuvants.

During and after the continuous mixing of the pressure-sensitively adhesive, hydroxyl-functionalized polybutadiene-polyurethane prepolymer in the melt with the polyisocyanates, the chemical reaction to give the chemically precrosslinked, pressure-sensitively adhesive polybutadiene-polyurethane advances continuously. Without catalysis or with moderate catalysis with a suitable catalyst, the reaction rate is sufficiently slow, and so thermoplastic processing is still possible for some time. During this time, which is generally within the range of minutes, the warm or hot, chemically reacting mixture can be shaped continuously to form a film. After shaping, the film can be cooled to room temperature, causing it to solidify immediately, independently of the progress of the chemical reaction. Even at room temperature, the reaction to give the chemically precrosslinked, pressure-sensitively adhesive polybutadiene-polyurethane advances until it reaches completion. At room temperature, the chemical reaction to give the chemically precrosslinked, pressure-sensitively adhesive polybutadiene-polyurethane is generally concluded completely after one to two weeks. Following complete reaction, the resultant chemically precrosslinked, pressure-sensitively adhesive polybutadiene-polyurethane is generally crosslinked chemically such that it is no longer meltable.

The continuous shaping of the warm or hot, chemically reacting mixture takes place preferably by means of roll application or by means of an extrusion die, but may also take place with other application methods, such as, for example, a comma bar. The shaped film is applied continuously to an incoming web-shaped carrier material, and is subsequently wound up. The incoming web-shaped carrier material may be, for example, an anti-adhesively furnished sheet or anti-adhesively furnished paper. Alternatively it may be a material already coated with a pressure-sensitive adhesive or with a functional layer, or may be a carrier, or may be any desired combinations of the stated materials in web form.

Following metered addition of the particularly preferred aliphatic or alicyclic polyisocyanate having an isocyanate functionality of three or greater than three to the meltable, pressure-sensitively adhesive hydroxyl-functionalized polybutadiene-polyurethane prepolymer in the melt, in other words at temperatures above room temperature, the skilled person must expect immediate gelling, in other words the immediate formation of crosslinked structures which make it impossible to carry out further mixing and subsequent coating and shaping to form the film. This is certainly the case if the prepolymer already contains branches. In that case, the skilled person must also expect this after metered addition of the aliphatic or alicyclic diisocyanate to this prepolymer. The fact that this does not occur was unforeseeable to the skilled person.

Since, as a result of the hotmelt character of the meltable, pressure-sensitively adhesive, hydroxyl-functionalized polybutadiene-polyurethane prepolymer, the windability of the film is not tied to the progress of a chemical reaction or to the rate of evaporation of a solvent, but instead only to the quickness with which the film cools, it is possible to attain very high coating speeds, and this represents an economic advantage. Moreover, there are no costs incurred for heating a heating tunnel section or for solvent incineration or solvent recovery. Because the meltable, pressure-sensitively adhesive, hydroxyl-functionalized polybutadiene-polyurethane prepolymer can be produced solventlessly, there are no costs incurred either for solvent incineration or recovery.

As a result of the possibility of absence of solvent, it is possible in principle to produce polymer films of any desired thickness, without foaming or bubbling caused by evaporating solvent.

With the process of the invention it is possible in particular to produce very homogeneous (homogeneously precrosslinked) thick layers and homogeneously precrosslinked three-dimensional shaped bodies. Homogeneous layer thicknesses of more than 100 µm, even above 1000 µm, can be produced outstandingly.

The process set out above is suitable especially for producing viscoelastic, chemically precrosslinked, thermally vulcanizable adhesive tapes (single-layer constructions or else multilayer constructions, having two or three layers, for instance) with layer thicknesses of between 100 µm and 10 000 µm, preferably between 200 µm and 5000 µm, more preferably between 300 µm and 2500 µm.

Since the continuous admixing of the polyisocyanates bringing about chemical precrosslinking to the meltable, pressure-sensitively adhesive, hydroxyl-functionalized polybutadiene-polyurethane prepolymer takes place only shortly before the shaping of the mixture to form a film, there is no need for blocking of reactive groups, and hence no need to use blocking agents. Accordingly, at no point in time is there release of blocking agents remaining in the film that might possibly disrupt the subsequent application either.

The meltable, pressure-sensitively adhesive, hydroxyl-functionalized polybutadiene-polyurethane prepolymer may also be produced or stored in a solvent or a solvent mixture. It may also be reacted in a solvent or solvent mixture with the polyisocyanates, and coated from the solution during the start of the reaction phase between the prepolymer and the polyisocyanates. Examples of suitable solvents include methyl ethyl ketone, acetone, butyl acetate, decalin or tetrahydrofuran. Surprisingly it has been found that the pot life of the reactive mixture in suitable solvents, especially in acetone, uncatalyzed or with moderate catalysis, amounts to at least several hours, usually indeed several days. A batchwise production process is therefore available for the reaction of a meltable, pressure-sensitively adhesive, hydroxyl-functionalized polybutadiene-polyurethane prepolymer with polyisocyanates in a solvent.

Because the precrosslinking is not initiated from the outside by radiation, such as UV or EBC radiation, for example, a polymer structure with continuously homogeneous properties is achieved even when the film produced is very thick or when the film comprises substantial amounts of fillers. Fillers can be incorporated in substantial amounts of, for example, 50% and more.

As a result of the fact that, as a general rule, the weight-averaged average molar mass of the meltable, pressure-sensitively adhesive, hydroxyl-functionalized polybutadiene-polyurethane prepolymer is low by comparison with many other thermoplastically processable (pre)polymers, it can be melted and processed thermoplastically at comparatively low temperatures. The temperatures, surprisingly, can be kept so low that there is no onset of the sulfur vulcanization, or other processes diminishing the storage stability, during the production of the chemically precrosslinked, thermally vulcanizable PSA or of the adhesive tape comprising this PSA. The temperature of the compound consisting of the chemically reacting mixture of the meltable, pressure-sensitively adhesive, hydroxyl-functionalized polybutadiene-polyurethane prepolymer, the aliphatic or alicyclic diisocyanate and/or more preferably the aliphatic or alicyclic polyisocyanate having an isocyanate functionality of three or greater than three, the ground sulfur and the optional further substances does not exceed 100° C. during production, preferably not 90° C., and more preferably is always below 80° C.

During and after the shaping of the melt to form a film, there are, as a general rule, no adhesively relevant differences in the film in longitudinal and transverse directions.

Adhesive Tape

A further subject of the invention is a pressure-sensitively adhesive, chemically precrosslinked, thermally vulcanizable shaped body, preferably a pressure-sensitively adhesive, chemically precrosslinked, thermally vulcanizable layer, comprising at least one chemically precrosslinked, pressure-sensitively adhesive polybutadiene-polyurethane and ground sulfur, as described in at least one of the claims, especially in claim 1, and/or as described earlier on in this specification. A shaped body of this kind may be obtained by shaping of the meltable, pressure-sensitively adhesive, hydroxyl-functionalized polybutadiene-polyurethane prepolymer, reacting with the polyisocyanates, during the reaction phase. A further subject of the invention is an adhesive tape comprising at least one chemically precrosslinked, thermally vulcanizable PSA layer, comprising at least one chemically precrosslinked, thermally vulcanizable PSA as described in at least one of the claims, especially in claim 1, and/or as described earlier in this specification.

The present invention thus also relates to an adhesive tape coated on one side or on both sides at least partially with the pressure-sensitive adhesive of the invention. This adhesive tape may also be an adhesive transfer tape. An adhesive tape allows particularly simple and precise bonding and is therefore particularly suitable.

The general expression "adhesive tape" encompasses a carrier material which is provided on one or both sides, in each case at least partially, with a (pressure-sensitive) adhesive. The carrier material encompasses all planar structures, examples being two-dimensionally extended sheets or sheet sections, tapes with extended length and limited width, tape sections, diecuts (in the form of edge surrounds or borders of an arrangement to be bonded, for example), other shaped articles, multi-layer arrangements and the like. For different applications it is possible to combine a very wide variety of different carriers, such as, for example, films, woven fabrics, nonwovens and papers, with the adhesives. Furthermore, the expression "adhesive tape" also encompasses what are called "adhesive transfer tapes", i.e. an adhesive tape without carrier. In the case of an adhesive transfer tape, the adhesive tape, prior to the application, is instead applied between flexible liners which are provided with a release coat and/or have anti-adhesive properties. For the application, generally, first one liner is removed, the adhesive is applied, and then the second liner is removed. The adhesive can thus be used directly to join two surfaces.

Also possible, however, are adhesive tapes which operate not with two liners, but instead with a single liner with double-sided release. In that case the web of adhesive tape is lined on its top face with one side of a double-sidedly releasing liner, while its bottom face is lined with the reverse side of the double-sidedly releasing liner, more particularly of an adjacent turn on a bale or roll.

For certain applications it may be desirable for one side or both sides of the adhesive tape not to be provided completely with adhesive, but instead for partially adhesive-free regions to be provided, in order to take account, for example, of cutouts in the surfaces to which bonding is to take place.

As the carrier material of an adhesive tape it is presently preferred to use polymer films, film composites, or films or film composites provided with organic and/or inorganic layers, preferably films, and more particularly dimensionally stable polymeric films or metal foils. Such films/film composites may consist of any common plastics used in film production, with examples—although without restriction—including the following:

Polyethylene, polypropylene—especially the oriented polypropylene (OPP) produced by monoaxial or biaxial stretching, cyclic olefin copolymers (COC), polyvinyl chloride (PVC), polyesters—especially polyethylene terephthalate (PET) and polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES) or polyimide (PI).

Polyester films have the advantage that they ensure temperature stability and provide enhanced mechanical stability. With very particular preference, therefore, a carrier layer in a liner of the invention consists of a polyester film, for example of biaxially oriented polyethylene terephthalate.

In the case of double-sidedly (self-)adhesive tapes, the adhesives used as the top and bottom layers may be identical or different adhesives of the invention, and/or the layer thicknesses thereof that are used may be the same or different. The carrier in this case may have been pretreated according to the prior art on one or both sides, with the achievement, for example, of an improvement in adhesive anchorage. The layers of PSA may optionally be lined with release papers or release films. Alternatively it is also possible for only one layer of adhesive to be lined with a double-sidedly releasing liner.

In one variant, a PSA of the invention is provided in the double-sidedly (self-)adhesive tape, and also any desired further adhesive is provided, for example one which adheres particularly well to a masking substrate or exhibits particularly good repositionability.

The thickness of the layer of PSA of the invention, present either in the form of an adhesive transfer tape or coated on a sheet-like structure, is preferably between 10 µm and 5000 µm, more preferably between 100 µm and 4000 µm and very preferably between about 200 µm and 3000 µm.

For double-sided adhesive tapes it is likewise the case for the adhesives that the thickness of the individual layer or layers of PSA is preferably between 10 µm and 5000 µm, more preferably between 100 µm and 4000 µm and very preferably between about 200 µm and 3000 µm.

Adhesive tapes coated on one or both sides with adhesives usually end the production process by being wound up to form a roll in the form of an archimedean spiral or in cross-wound form. To prevent the adhesives making contact with one another in the case of double-sided adhesive tapes, or to prevent the adhesives sticking to the carrier in the case of single-sided adhesive tapes, the adhesive tapes prior to winding are lined with a covering material (also referred to as release material) which is wound up together with the adhesive tape. The skilled person knows such covering materials under the names of liners or release liners. In addition to the covering of single-sided or double-sided adhesive tapes, liners are also used for the lining of pure adhesives (adhesive transfer tape) and adhesive-tape sections (labels for example).

The chemically precrosslinked, thermally vulcanizable pressure-sensitive adhesive of the present invention is used preferably as a layer for producing a thermally vulcanizable, pressure-sensitively adhesive tape or sealing tape, and also shaped articles or diecuts produced therefrom, and the thermally vulcanizable, pressure-sensitively adhesive tape or sealing tape here may comprise additionally pressure-sensitively adhesive and/or non-pressure-sensitively adhesive layers, carrier films or foils, adhesion-promoting layers, release layers or other functional layers, and also a plurality of adhesive-tape layers which can be vulcanized thermally or can be otherwise cured or crosslinked, and it may have been furnished with a release liner, which may have siliconization on one or both sides.

Use

The chemically precrosslinked, thermally vulcanizable pressure-sensitive adhesive of the invention and also thermally vulcanizable adhesive tapes comprising this PSA exhibit an outstanding combination of product properties of a kind which could not have been predicted even by the skilled person.

In the course of use as intended, it is possible to differentiate between three phases: the phase before thermal vulcanization, the phase during thermal vulcanization, and the phase after thermal vulcanization. Surprisingly it has been possible to unite many of the sometimes mutually exclusive product properties desired for each of the phases in one product and at the same time to still leave sufficient room for variable design possibilities in the PSA of the invention as well.

Before the thermal vulcanization, the chemically precrosslinked, thermally vulcanizable PSA of the invention is preferably highly tacky and at the same time has a high shear strength. In peel adhesion measurements, typical peel values on steel of greater than 3.0, preferably between 6.0 and 11.0, N/cm are achieved. In the static shear test, the typical holding times under a shearing load of 500 g for a bond area of 13×20 $mm^2$ on steel are greater than 10 000, preferably greater than 20 000, minutes.

During the thermal vulcanization, the chemically precrosslinked, thermally vulcanizable PSA of the invention proves to have high shear strength. In the static shear test, during the heating to 200° C. and in the further course up to the end of the vulcanization (full curing), a slippage of only 1-3 mm is typically observed for a bond to steel with a bond area of 13×25 $mm^2$ under a shearing load of 200 g. At lower shearing loads, the slippage distance is typically 0 mm.

After the thermal vulcanization, the chemically precrosslinked, thermally vulcanizable PSA of the invention is fully cured. The attainable bond strengths can be adjusted in accordance with requirements within a wide range. In the lap shear test, for example, they span the range from greater than 0 to at least 30 N/$mm^2$. The bond strength here is controlled primarily by the fraction of sulfer in relation to the polybutadiene-polyurethane. Further control options arise from the optional formulation possibilities.

The PSA of the invention can be adjusted specifically in such a way as to cure within a short time within the temperature range between 130° C. and 230° C. A short time means in particular up to 30 minutes, preferably between approximately 5 and 30 minutes, depending on whether an accelerator system, and which accelerator system, is being used. It is adjustable here in such a way that good adhesion to the substrate to which the adhesive has been applied is built up in the course of curing, so that after completion of the thermal vulcaninzation there is cohesive fracture within the layer of adhesive when attempts are made to remove the layer of adhesive from the substrate in, for example, a lap shear test in accordance with DIN EN 1465 or in a peel test.

The substrates to which the adhesive or the adhesive tape is applied may typically be steel sheets of the kind used in powder coating operations or in finishing operations in the automotive industry. They may be galvanized or ungalvanized. Other kinds of metal as well, such as aluminium, for example, are suitable, including, in particular, in various combinations. Alternatively, the substrates may be painted or precoated metal sheets, examples being cataphoretically dip-coated metal sheets (CEC sheets), of the kind present on the finishing lines of the automotive industry. Oiled metal sheets, of the kind used in automotive bodyshell construction, are likewise suitable in principle, although in that case detractions in terms of the shear strength during the thermal vulcanization must be expected, depending on the level of oiling.

Because the PSA of the invention adheres well to the typical substrates of automotive bodyshell construction and of the finishing line after the thermal vulcanization, and because the bond strengths can be adjusted as per requirements within a wide range, the PSA of the invention and the adhesive tape of the invention can be used not only for the adhesive bonding but also for sealing, as for example for hem flange bonding, for hem flange sealing, for seam sealing, for underseal bonding, for hole stopping, and much more.

With the PSA of the invention, especially in adhesive tape form or as part of an adhesive tape, outstanding success has been achieved in solving the problem addressed by the invention. Made available accordingly is a pressure-sensitive adhesive which can be vulcanized thermally within a temperature range from 130° C. to 230° C. and which during the heating phase has shear strength at least under low to moderate load, and also an adhesive tape with such a pressure-sensitive adhesive is provided. The thermally vulcanizable PSA or the adhesive tape comprising said PSA performs effective holding during the heating phase, in which the vulcanization has not yet started and in which known heat-curable adhesives typically undergo liquification or at least severe softening, and so there is no need for preliminary fixing of the components to be bonded. On application in a bonded joint, the PSA—especially in adhesive tape form—does not liquefy during the thermal vulcanization, i.e. under severe heating. Accordingly, it does not escape substantially from the bonded joint.

The thermally vulcanizable PSA and the corresponding adhesive tape, respectively, can be used very advantageously in powder coating operations, as for example for the bonding of various metals, and also wherever high baking temperatures are available. This is the case in particular on the finishing lines in the automotive industry. There, the thermally vulcanizable PSA and the corresponding adhesive tape, respectively, can be used both in bodyshell construction on oiled metal sheets and also on CEC-coated or otherwise painted metal sheets, for bonding and/or sealing— for example, for hem flange bonding, for hem flange sealing, for seam sealing, for underseal bonding, for hole stopping, and much more. The bond strengths attainable with the thermally vulcanizable PSA and the corresponding adhesive tape can be adjusted arbitrarily and in accordance with requirements, within wide limits. The attainable lap shear strengths span the range between greater than 0 to at least 30.0 N/mm$^2$. The thermally vulcanizable PSA and the corresponding adhesive tape can be produced within a temperature range from 40° C. to 100° C. in a compounding and extrusion operation. The base elastomer of the thermally vulcanizable PSA is present in the form of a melt within this temperature range. During processing as a melt or during the subsequent storage at temperatures up to 40° C., there is no onset of the vulcanization reaction. In the temperature range from room temperature (20° C.-25° C., ideally 23° C.) to 30° C., the base elastomer of the thermally vulcanizable PSA is sufficiently solid or of high viscosity, and so can be wound, in the form of a film coated onto a release liner or onto a carrier material, to form a roll, without running out of the side and/or being squeezed out by the winding pressure.

Particular Implementations of the Invention

The intention below summarily is to summarize certain particularly advantageous embodiments of the invention and also particularly advantageous inventive process variants, without wishing hereby to impose any restriction on the concept of the invention. The respective embodiment and process variants stated may be combined, moreover, with the other features of the invention as they are described in this specification.

Embodiment 1 relates to a thermally vulcanizable pressure-sensitive adhesive comprising a chemically precrosslinked, pressure-sensitively adhesive polybutadiene-polyurethane and ground sulfur.

Embodiment 2 relates to a thermally vulcanizable pressure-sensitive adhesive having the features as per embodiment 1, where further the chemically precrosslinked, pressure-sensitively adhesive polybutadiene-polyurethane is or comprises the chemical reaction product of at least the following starting materials:

a) at least one meltable, pressure-sensitively adhesive, hydroxyl-functionalized polybutadiene-polyurethane prepolymer and b) at least one aliphatic or alicyclic diisocyanate and/or preferably at least one aliphatic or alicyclic polyisocyanate having an isocyanate functionality of three or greater than three.

Embodiment 3 relates to a thermally vulcanizable pressure-sensitive adhesive having the features as per embodiment 2, where further the polybutadiene-polyurethane prepolymer is the reaction product of one or more polybutadiene-polyols and/or derivates thereof with one or more aliphatic and/or alicyclic polyisocyanates.

Embodiment 4 relates to a thermally vulcanizable pressure-sensitive adhesive having the features as per embodiment 2 and/or having the features as per embodiment 3, where further the meltable, pressure-sensitively adhesive, hydroxyl-functionalized polybutadiene-polyurethane prepolymer comprises the chemical reaction product of at least one polybutadiene-diol having a number-averaged average hydroxyl functionality in the range from 1.5 to 2, preferably 1.8 to 2, and/or derivative thereof, of at least one chain extender having a hydroxyl functionality of two and a molar mass of less than or equal to 300 g/mol, and optionally of at least one polybutadiene-polyol having a number-averaged average hydroxyl functionality of between greater than 2.0 and less than or equal to 3.0 with at least one aliphatic or alicyclic diisocyanate and/or at least one aliphatic or alicyclic polyisocyanate having an isocyanate functionality of three or greater than three.

Embodiment 5 relates to a thermally vulcanizable pressure-sensitive adhesive having the features as per embodiment 2 and/or having the features as per embodiment 3 and/or having the features as per embodiment 4, where further the numerical fraction of the hydroxyl groups introduced for forming the meltable, pressure-sensitively adhesive, hydroxyl-functionalized polybutadiene-polyurethane prepolymer and originating from the at least one chain extender is between greater than or equal to 20.0% and less than or equal to 80.0%, preferably between greater than or equal to 30.0% and less than or equal to 70.0%.

Embodiment 6 relates to a thermally vulcanizable pressure-sensitive adhesive having the features as per embodiment 2 and/or having the features as per embodiment 3 and/or having the features as per embodiment 4 and/or having the features as per embodiment 5, where the numerical fraction of the hydroxyl groups introduced for forming the meltable, pressure-sensitively adhesive, hydroxyl-functionalized polybutadiene-polyurethane prepolymer and originating from the optionally at least one polybutadiene-polyol having a number-averaged average functionality of between greater than 2.0 and less than or equal to 3.0, is between greater than or equal to 0.0% and less than or equal to 50%, preferably between greater than or equal to 10.0% and less than or equal to 40%, more preferably between greater than or equal to 15.0% and less than or equal to 30%.

Embodiment 7 relates to a thermally vulcanizable pressure-sensitive adhesive having the features as per embodiment 2 and/or having the features as per embodiment 3 and/or having the features as per embodiment 4 and/or having the features as per embodiment 5 and/or having the features as per embodiment 6, where further the aliphatic or alicyclic diisocyanate for preparing the polybutadiene-polyurethane prepolymer is or comprises isophorone diisocyanate and/or dicyclohexylmethane 4,4'-diisocyanate.

Embodiment 8 relates to a thermally vulcanizable pressure-sensitive adhesive having the features as per embodiment 2 and/or having the features as per embodiment 3 and/or having the features as per embodiment 4 and/or having the features as per embodiment 5 and/or having the features as per embodiment 6 and/or having the features as per embodiment 7, where further the aliphatic or alicyclic polyisocyanate for preparing the polybutadiene-polyurethane prepolymer is or comprises a trimerized or more highly oligomerized form of hexamethylene diisocyanate and/or of isophorone diisocyanate.

Embodiment 9 relates to a thermally vulcanizable pressure-sensitive adhesive having the features as per embodiment 2 and/or having the features as per embodiment 3 and/or having the features as per embodiment 4 and/or having the features as per embodiment 5 and/or having the features as per embodiment 6 and/or having the features as per embodiment 7 and/or having the features as per embodiment 8, where further the ratio of the total number of the isocyanate groups introduced in the preparation of the polybutadiene-polyurethane prepolymer and in the reaction thereof, in other words the precrosslinking reaction, to the total number of hydroxyl groups introduced is between greater than or equal to 0.5 and less than or equal to 1.3, preferably between greater than or equal to 0.6 and less than or equal to 1.2, more preferably between greater than or equal to 0.7 and less than or equal to 1.1, very preferably between greater than or equal to 0.8 and less than or equal to 1.0.

Embodiment 10 relates to a thermally vulcanizable pressure-sensitive adhesive having the features as per embodiment 2 and/or having the features as per embodiment 3 and/or having the features as per embodiment 4 and/or having the features as per embodiment 5 and/or having the features as per embodiment 6 and/or having the features as per embodiment 7 and/or having the features as per embodiment 8 and/or having the features as per embodiment 9, where further the aliphatic or alicyclic diisocyanate for reaction with the meltable, pressure-sensitively adhesive, hydroxyl-functionalized polybutadiene-polyurethane prepolymer is or comprises isophorone diisocyanate and/or dicyclohexylmethane 4,4'-diisocyanate.

Embodiment 11 relates to a thermally vulcanizable pressure-sensitive adhesive having the features as per embodiment 2 and/or having the features as per embodiment 3 and/or having the features as per embodiment 4 and/or having the features as per embodiment 5 and/or having the features as per embodiment 6 and/or having the features as per embodiment 7 and/or having the features as per embodiment 8 and/or having the features as per embodiment 9 and/or having the features as per embodiment 10, where further the aliphatic or alicyclic polyisocyanate for reaction with the meltable, pressure-sensitively adhesive, hydroxyl-functionalized polybutadiene-polyurethane prepolymer is or comprises a trimerized or more highly oligomerized form of hexamethylene diisocyanate and/or of isophorone diisocyanate.

Embodiment 12 relates to a thermally vulcanizable pressure-sensitive adhesive having the features as per embodiment 2 and/or having the features as per embodiment 3 and/or having the features as per embodiment 4 and/or having the features as per embodiment 5 and/or having the features as per embodiment 6 and/or having the features as per embodiment 7 and/or having the features as per embodiment 8 and/or having the features as per embodiment 9 and/or having the features as per embodiment 10 and/or having the features as per embodiment 11, where the thermally vulcanizable pressure-sensitive adhesive further comprises one or more substances selected from the list consisting of vulcanization accelerators, fillers, epoxy resins, tackifier resins, bitumen, plasticizers, oils.

Embodiment 13 relates to a thermally vulcanizable pressure-sensitive adhesive having the features as per embodiment 2 and/or having the features as per embodiment 3 and/or having the features as per embodiment 4 and/or having the features as per embodiment 5 and/or having the features as per embodiment 6 and/or having the features as per embodiment 7 and/or having the features as per embodiment 8 and/or having the features as per embodiment 9 and/or having the features as per embodiment 10 and/or having the features as per embodiment 11 and/or having the features as per embodiment 12, where the thermally vulcanizable pressure-sensitive adhesive further comprises ageing inhibitors and/or further auxiliaries and adjuvants.

Embodiment 14 relates to a thermally vulcanizable pressure-sensitive adhesive having the features as per embodiment 2 and/or having the features as per embodiment 3 and/or having the features as per embodiment 4 and/or having the features as per embodiment 5 and/or having the features as per embodiment 6 and/or having the features as per embodiment 7 and/or having the features as per embodiment 8 and/or having the features as per embodiment 9 and/or having the features as per embodiment 10 and/or having the features as per embodiment 11 and/or having the features as per embodiment 12 and/or having the features as per embodiment 13, where the thermally vulcanizable pressure-sensitive adhesive comprises at least one filler, namely ground calcium oxide, whose weight fraction in the thermally vulcanizable pressure-sensitive adhesive is between 5.0 and 30.0 wt %, preferably between 10.0 and 20.0 wt %.

Embodiment 15 relates to a thermally vulcanizable pressure-sensitive adhesive having the features as per embodiment 2 and/or having the features as per embodiment 3 and/or having the features as per embodiment 4 and/or having the features as per embodiment 5 and/or having the features as per embodiment 6 and/or having the features as per embodiment 7 and/or having the features as per embodiment 8 and/or having the features as per embodiment 9 and/or having the features as per embodiment 10 and/or having the features as per embodiment 11 and/or having the features as per embodiment 12 and/or having the features as per embodiment 13 and/or having the features as per embodiment 14, where the thermally vulcanizable pressure-sensitive adhesive comprises at least one filler, namely ground chalk and/or ground talc and/or ground kaolin, where the weight fraction of these fillers in the thermally vulcanizable pressure-sensitive adhesive together is between 10.0 and 50.0 wt %, preferably between 20.0 and 40.0 wt %.

Embodiment 16 relates to a thermally vulcanizable pressure-sensitive adhesive having the features as per embodiment 2 and/or having the features as per embodiment 3 and/or having the features as per embodiment 4 and/or having the features as per embodiment 5 and/or having the features as per embodiment 6 and/or having the features as per embodiment 7 and/or having the features as per embodiment 8 and/or having the features as per embodiment 9 and/or having the features as per embodiment 10 and/or having the features as per embodiment 11 and/or having the features as per embodiment 12 and/or having the features as per embodiment 13 and/or having the features as per embodiment 14 and/or having the features as per embodiment 15, where the thermally vulcanizable pressure-sensitive adhesive comprises at least one epoxy resin, namely the reaction product of bisphenol A and epichlorohydrin, preferably the reaction product of bisphenol A and epichlorohydnn having a number-averaged average molecular weight of less than or equal to 700 g/mol (CAS No. 25068-38-6).

Embodiment 17 relates to a thermally vulcanizable pressure-sensitive adhesive having the features as per embodiment 2 and/or having the features as per embodiment 3 and/or having the features as per embodiment 4 and/or having the features as per embodiment 5 and/or having the features as per embodiment 6 and/or having the features as per embodiment 7 and/or having the features as per embodiment 8 and/or having the features as per embodiment 9 and/or having the features as per embodiment 10 and/or having the features as per embodiment 11 and/or having the features as per embodiment 12 and/or having the features as per embodiment 13 and/or having the features as per embodiment 14 and/or having the features as per embodiment 15 and/or having the features as per embodiment 16, where the thermally vulcanizable pressure-sensitive adhesive comprises one or more vulcanization accelerators, namely at least one vulcanization accelerator from the class of the mercapto accelerators and/or one vulcanization accelerator from the class of the thiuram accelerators and/or one vulcanization accelerator from the class of the dithiocarbamate accelerators.

Embodiment 18 relates to a thermally vulcanizable pressure-sensitive adhesive having the features as per embodiment 17, where vulcanization accelerators used comprise di(benzothiazyl) disulfide (MBTS, CAS No.: 120-78-5) and/or tetrabenzyldiuram disulfide (TBzTD, CAS No.: 10591-85-2) and/or zinc bis(dibenzyldithiocarbamate) (ZBEC, CAS No.: 14726-36-4) or a combination of two or all of these substances, where preferably exclusively one, two or all of the aforesaid substances are used as vulcanization accelerators.

Embodiment 19 relates to a thermally vulcanizable pressure-sensitive adhesive having the features as per embodiment 17 and/or having the features as per embodiment 18, where the total concentration of vulcanization accelerators in the thermally vulcanizable pressure-sensitive adhesive is between at least 0.1 percent by weight and not more than 15.0 percent by weight, preferably between at least 0.5 and not more than 12.5 percent by weight, more preferably between at least 1.0 and not more than 10.0 percent by weight.

Embodiment 20 relates to a thermally vulcanizable pressure-sensitive adhesive having the features as per embodiment 2 and/or having the features as per embodiment 3 and/or having the features as per embodiment 4 and/or having the features as per embodiment 5 and/or having the features as per embodiment 6 and/or having the features as per embodiment 7 and/or having the features as per embodiment 8 and/or having the features as per embodiment 9 and/or having the features as per embodiment 10 and/or having the features as per embodiment 11 and/or having the features as per embodiment 12 and/or having the features as per embodiment 13 and/or having the features as per embodiment 14 and/or having the features as per embodiment 15 and/or having the features as per embodiment 16 and/or having the features as per embodiment 17 and/or having the features as per embodiment 18 and/or having the features as per embodiment 19, where the thermally vulcanizable pressure-sensitive adhesive comprises at least one ageing inhibitor, namely a sterically hindered phenol, preferably pentaerythritol tetrakis(3-(3-5-di-tert-butyl-4-hydroxyphenyl)propionate) (CAS No.: 6683-19-8).

Embodiment 21 relates to a thermally vulcanizable pressure-sensitive adhesive having the features as per embodiment 2 and/or having the features as per embodiment 3 and/or having the features as per embodiment 4 and/or having the features as per embodiment 5 and/or having the features as per embodiment 6 and/or having the features as per embodiment 7 and/or having the features as per embodiment 8 and/or having the features as per embodiment 9 and/or having the features as per embodiment 10 and/or having the features as per embodiment 11 and/or having the features as per embodiment 12 and/or having the features as per embodiment 13 and/or having the features as per embodiment 14 and/or having the features as per embodiment 15 and/or having the features as per embodiment 16 and/or having the features as per embodiment 17 and/or having the features as per embodiment 18 and/or having the features as per embodiment 19 and/or having the features as per embodiment 20, where the thermally vulcanizable pressure-sensitive adhesive is composed of the following fractions:

30.0-55.0 wt % of a chemically precrosslinked, pressure-sensitively adhesive polybutadiene-polyurethane
0.1-15.0 wt % of ground sulfur
0.1-10.0 wt % of vulcanization accelerators
1.0-20.0 wt % of an epoxy resin
5.0-30.0 wt % of ground calcium oxide
10.0-50.0 wt % of fillers selected from ground chalk, ground talc and/or ground kaolin,
and optionally further comprising ageing inhibitors, tackifier resins, bitumen, plasticizers, oils, and other auxiliaries and adjuvants, so that the overall composition adds up to 100 wt %.

Embodiment 22 relates to an adhesive tape comprising at least one thermally vulcanizable pressure-sensitive adhesive having the features as per embodiment 1 and/or having the features as per embodiment 2 and/or having the features as per embodiment 3 and/or having the features as per embodiment 4 and/or having the features as per embodiment 5 and/or having the features as per embodiment 6 and/or having the features as per embodiment 7 and/or having the features as per embodiment 8 and/or having the features as per embodiment 9 and/or having the features as per embodiment 10 and/or having the features as per embodiment 11 and/or having the features as per embodiment 12 and/or having the features as per embodiment 13 and/or having the features as per embodiment 14 and/or having the features as per embodiment 15 and/or having the features as per embodiment 16 and/or having the features as per embodiment 17 and/or having the features as per embodiment 18 and/or having the features as per embodiment 19 and/or having the features as per embodiment 20 and/or having the features as per embodiment 21, where the thermally vulcanizable pressure-sensitive adhesive is present in particular in the form of a layer of the adhesive tape.

Process variant 1 relates to a process for producing a thermally vulcanizable pressure-sensitive adhesive comprising a chemically precrosslinked, pressure-sensitively adhesive polybutadiene-polyurethane and ground sulfur, where
first of all a polybutadiene-polyurethane prepolymer is prepared by chemical reaction of one or more polybutadiene-polyols and/or derivatives thereof—optionally in the presence of further polyols and/or derivatives thereof—with one or more aliphatic and/or alicyclic polyisocyanates, where the proportions of polyols and polyisocyanates are selected such that the resulting prepolymer is hydroxyl-functionalized, and where further advantageously the resulting prepolymer is pressure-sensitively adhesive and meltable,
the polybutadiene-polyurethane prepolymer is admixed with ground sulfur,
the polybutadiene-polyurethane prepolymer is admixed in the melt with further aliphatic and/or alicyclic polyisocyanates, and so a reaction of the prepolymer with the polyisocyanates commences.

Process variant 2 relates to a process having the features as per process variant 1, where further the thermally vulcanizable pressure-sensitive adhesive is one having the features as per embodiment 1 and/or having the features as per embodiment 2 and/or having the features as per embodiment 3 and/or having the features as per embodiment 4 and/or having the features as per embodiment 5 and/or having the features as per embodiment 6 and/or having the features as per embodiment 7 and/or having the features as per embodiment 8 and/or having the features as per embodiment 9 and/or having the features as per embodiment 10 and/or having the features as per embodiment 11 and/or having the features as per embodiment 12 and/or having the features as per embodiment 13 and/or having the features as per embodiment 14 and/or having the features as per embodiment 15 and/or having the features as per embodiment 16 and/or having the features as per embodiment 17 and/or having the features as per embodiment 18 and/or having the features as per embodiment 19 and/or having the features as per embodiment 20 and/or having the features as per embodiment 21 and/or having the features as per embodiment 22.

Process variant 3 relates to a process having the features as per process variant 1 and/or having the features as per process variant 2, where further the reaction for preparing the polybutadiene-polyurethane prepolymer, in other words the chemical reaction of the one or more polybutadiene-polyols and/or derivatives thereof—and optionally of the further polyols and/or derivatives thereof—with the one or more aliphatic and/or alicyclic polyisocyanates takes place with addition of a catalyst, more particular of a catalyst comprising bismuth and carbon, preferably a bismuth carboxylate or a bismuth carboxylate derivative.

Process variant 4 relates to a process having the features as per process variant 1 and/or having the features as per process variant 2 and/or having the features as per process variant 3, where further the ratio of the total number of isocyanate groups introduced in the preparation of the polybutadiene-polyurethane prepolymer and in the reaction thereof, in other words the precrosslinking reaction, to the total number of hydroxyl groups introduced is between greater than or equal to 0.5 and less than or equal to 1.3, preferably between greater than or equal to 0.6 and less than or equal to 1.2, more preferably between greater than or equal to 0.7 and less than or equal to 1.1, very preferably between greater than or equal to 0.8 and less than or equal to 1.0.

Process variant 5 relates to a process having the features as per process variant 1 and/or having the features as per process variant 2 and/or having the features as per process variant 3, and/or having the features as per process variant 4, where further the reaction for preparing the polybutadiene-polyurethane prepolymer, in other words the chemical reaction of the one or more polybutadiene-polyols and/or derivatives thereof—and optionally of the further polyols and/or derivatives thereof—with the one or more aliphatic and/or alicyclic polyisocyanates takes place in the presence of at least one epoxy resin, more particularly in the presence of the reaction product of bisphenol A and epichlorohydrin, more preferably in the presence of the reaction product of bisphenol A and epichlorohydrin having a number-averaged average molecular weight of less than or equal to 700 g/mol (CAS No. 25068-38-6).

Process variant 6 relates to a process having the features as per process variant 1 and/or having the features as per process variant 2 and/or having the features as per process variant 3 and/or having the features as per process variant 4 and/or having the features as per process variant 5, where the ground sulfur, the further aliphatic and/or alicyclic polyisocyanates and optionally further substances and/or additives are added to the prepolymer in a joint, continuous operation.

Process variant 7 relates to a process having the features as per process variant 1 and/or having the features as per process variant 2 and/or having the features as per process variant 3 and/or having the features as per process variant 4 and/or having the features as per process variant 5, and/or having the features as per process variant 6, where the blending of the prepolymer with the further aliphatic and/or alicyclic polyisocyanates, which are used for reaction with the prepolymer advantageously also together with the ground sulfur and optionally with the further substances and/or additives, takes place in a solvent-free continuous compounding operation.

Process variant 8 relates to a process having the features as per process variant 7, where the continuous compounding operation takes place in a continuous mixing assembly, more particularly in a planetary roller extruder, an annular extruder or a twin-screw extruder.

Process variant 9 relates to a process having the features as per process variant 7 and/or having the features as per process variant 8, where the temperature of the compound during compounding does not exceed 100° C., preferably 90° C., more preferably 80° C.

Process variant 10 relates to a process having the features as per process variant 1 and/or having the features as per process variant 2 and/or having the features as per process variant 3 and/or having the features as per process variant 4 and/or having the features as per process variant 5 and/or having the features as per process variant 6 and/or having the features as per process variant 7 and/or having the features as per process variant 8 and/or having the features as per process variant 9, where the chemical reaction of the at least one meltable, pressure-sensitively adhesive, hydroxyl-functionalized polybutadiene-polyurethane prepolymer with the at least one aliphatic or alicyclic polyisocyanate—more particularly diisocyanate and/or polyisocyanate having an isocyanate functionality of three or greater—to give the chemically precrosslinked, pressure-sensitively adhesive polybutadiene-polyurethane is initiated in a continuous extrusion or compounding operation by continuous metered addition of the at least one aliphatic or alicyclic polyisocyanate during the continuous extrusion or compounding operation into the continuous mixing assembly to the continuously conveyed compound comprising the at least one meltable, pressure-sensitively adhesive, hydroxyl-functionalized polybutadiene-polyurethane prepolymer, sulfur and the optional further substances, such as, for instance, epoxy resins, tackifier resins, bitumen, plasticizers, oils, vulcanization accelerators, fillers, ageing inhibitors and also other auxiliaries and adjuvants.

Process variant 11 relates to a process having the features as per process variant 1 and/or having the features as per process variant 2 and/or having the features as per process variant 3 and/or having the features as per process variant 4 and/or having the features as per process variant 5 and/or having the features as per process variant 6 and/or having the features as per process variant 7 and/or having the features as per process variant 8 and/or having the features as per process variant 9 and/or having the features as per process variant 10, where the prepolymer is shaped as a layer, more particularly placed onto a carrier material, after the further aliphatic and/or alicyclic polyisocyanates have been admixed to the melt of the polybutadiene-polyurethane prepolymer, more particularly after the reaction of the prepolymer with the polyisocyanates has commenced.

Process variant 12 relates to a process having the features as per process variant 7 and/or having the features as per process variant 8 and/or having the features as per process variant 9 and/or having the features as per process variant 10 and/or having the features as per process variant 11, where the continuous compounding operation is followed, furthermore by a continuous coating operation wherein the blended prepolymer is shaped to a layer, more particularly laid onto a carrier material.

Preference is given, moreover, to an adhesive tape comprising at least one thermally vulcanizable pressure-sensitive adhesive having the features as per embodiment 1 and/or having the features as per embodiment 2 and/or having the features as per embodiment 3 and/or having the features as per embodiment 4 and/or having the features as per embodiment 5 and/or having the features as per embodiment 6 and/or having the features as per embodiment 7 and/or having the features as per embodiment 8 and/or having the features as per embodiment 9 and/or having the features as per embodiment 10 and/or having the features as per embodiment 11 and/or having the features as per embodiment 12 and/or having the features as per embodiment 13 and/or having the features as per embodiment 14 and/or having the features as per embodiment 15 and/or having the features as per embodiment 16 and/or having the features as per embodiment 17 and/or having the features as per embodiment 18 and/or having the features as per embodiment 19 and/or having the features as per embodiment 20 and/or having the features as per embodiment 21 and/or having the features as per embodiment 22, more particularly comprising at least one layer of a pressure-sensitive adhesive of this kind.

Preference is further given to an adhesive tape comprising at least one thermally vulcanizable pressure-sensitive adhesive obtainable by a process having the features as per process variant 11 and/or having the features as per process variant 12.

EXPERIMENTAL SECTION

The following examples are intended to provide more detailed description of the invention and its advantages without wishing thereby to restrict the invention.

The test methods below were used in order to characterize briefly the specimens produced in accordance with the invention:

Dynamic Mechanical Analysis (DMA) for Determining the Storage Modulus G' and the Loss Modulus G"

To characterize the meltable, pressure-sensitively adhesive, hydroxyl-functionalized polybutadiene-polyurethane prepolymers, determinations were made of the storage modulus G' and the loss modulus G" by means of Dynamic Mechanical Analysis (DMA).

The measurements took place using the shear rate-controlled rheometer DSR 200 N from Rheometric Scientific in an oscillation test with a sinusoidally oscillating shearing load in a plate/plate arrangement. The storage modulus G' and the loss modulus G" were determined in a frequency sweep from $10^{-1}$ to $10^2$ rad/sec at a temperature of 25° C. G' and G" are defined as follows:

$G'=\tau/\gamma \cdot \cos(\delta)$ ($\tau$=shear stress, $\gamma$=deformation, $\delta$=phase angle=phase shift between shear stress vector and deformation vector).

$G''=\tau/\gamma \cdot \sin(\delta)$ ($\tau$=shear stress, $\gamma$=deformation, $\delta$=phase angle=phase shift between shear stress vector and deformation vector).

The definition of the angular frequency is: $\omega=2\pi \cdot f$ (f=frequency. The units are rad/sec.

The thickness of the samples measured was always between 0.9 and 1.1 mm (1±0.1 mm). The sample diameter was 25 mm in each case. Pre-tensioning was carried out with a load of 3 N. The stress of the sample bodies for all the measurements was 2500 Pa.

Dynamic Mechanical Analysis (DMA) for Determining the Complex Viscosity ($\eta^*$)

To characterize the meltable, pressure-sensitively adhesive, hydroxyl-functionalized polybutadiene-polyurethane prepolymers, determinations were also made of the complex viscosity by means of Dynamic Mechanical Analysis (DMA).

The measurements took place using the shear rate-controlled rheometer DSR 200 N from Rheometric Scientific in an oscillation test with a sinusoidally oscillating shearing load in a plate/plate arrangement. The complex viscosity was determined in a temperature sweep from −50° C. to +250° C. at an oscillation frequency of 10 rad/s. The complex viscosity $\eta^*$ is defined as follows: $\eta^*=G^*/\omega$ ($G^*$=complex shear modulus, $\omega$=angular frequency).

The further definitions are as follows:

$$G^*=\sqrt{(G')^2+(G'')^2}$$

(G"=viscosity modulus (loss modulus), G'=elasticity modulus (storage modulus)).

$G''=\tau/\gamma \cdot \sin(\delta)$ ($\tau$=shear stress, $\gamma$=deformation, $\delta$=phase angle=phase shift between shear stress vector and deformation vector).

$G'=\tau/\gamma \cdot \cos(\delta)$ ($\tau$=shear stress, $\gamma$=deformation, $\delta$=phase angle=phase shift between shear stress vector and deformation vector).

$$\omega=2\pi \cdot f (f=\text{frequency}).$$

The thickness of the samples measured was always between 0.9 and 1.1 mm (1±0.1 mm). The sample diameter was 25 mm in each case. Pre-tensioning was carried out with a load of 3 N. The stress of the sample bodies for all the measurements was 2500 Pa.

Peel Adhesion

The peel adhesion was determined according to PSTC-101. The measurement always took place before the thermal vulcanization of the samples. In accordance with this method, the strip to be measured, 20 mm wide and 1.2 mm thick, of the shaped, chemically precrosslinked, thermally vulcanizable pressure-sensitive adhesive of the invention was applied to the substrate, lined with a polyester film 75 μm thick and etched with trichloroacetic acid and thereby reinforced on its reverse, then rolled over ten times with a 4 kg steel roller at a speed of 10 m/min, and immediately thereafter peeled off under defined conditions by means of a tensile testing machine. The peel angle was always 90°, the peel velocity 300 mm/min. The force required for peel removal is the peel adhesion, and is reported in the units N/cm. The substrate was always stainless steel (DC04) or aluminium.

Release Force with One-Sided Edge Tension (Dynamic L-Jig Test)

The method serves for determining the detachment force of double-sided adhesive tapes on single-sided edge tension.

The measurement took place always before the thermal vulcanization of the samples.

An L-shaped stainless steel bracket (L-jig) was bonded to a cleaned and conditioned stainless steel plate (DC04) using a test specimen cut to a square (25 mm edge length, thickness: 1.2 mm). The bonded assembly was subjected to a pressure of 60 N for 5 seconds. After an exposure time of 24 h at 23° C. and 50% relative humidity, the L-jig was pulled off with a tensile testing machine at a velocity of 300 mm/min at room temperature (23° C.). The force required to remove it is the release force, and is reported in the units N/cm. Considered to be good values for a double-sided adhesive tape are values starting from 60 N/cm, preferably values starting from 75 N/cm. Values starting from 100 N/cm are considered to be very good.

Static Shear Test Before Thermal Vulcanization

Before the thermal vulcanization of the samples, the static shear test according to the test protocol PSTC-107 took place. According to this method, the adhesive strips for measurement were applied to the substrate (stainless steel, DC04), pressed on for 5 minutes with a 500 g weight, and then exposed to a constant shearing load. The bond area was in each case 13×20 mm. The shearing load on this bond area was 500 g. The thickness of the samples was 1.2 mm. The measurement took place at room temperature (23° C.). The adhesive strips for measurement were 1.2 mm thick and were reinforced on the reverse side with a polyester film which was 75 µm thick and had been etched with trichloroacetic acid. The result ascertained was the holding time, in minutes.

Dynamic Shear Test (Tensileshear Strength)

The dynamic shear test took place on the basis of DIN EN 1465. It took place both before and after the thermal vulcanization of the bonded samples. For this purpose, rectangular diecuts with dimensions of 25.0 mm×12.5 mm were punched from a layer 1.2 mm thick of the shaped, chemically precrosslinked, thermally vulcanizable pressure-sensitive adhesive of the invention, lined on both sides with a release paper in each case. The release papers were subsequently removed in each case from one side of a diecut.

The diecuts were placed congruently in each case onto the end of a test specimen (substrate) with dimensions of 100.0 mm×25.0 mm×2.0 mm. The diecuts now adhered in each case to this test specimen. Test specimens of stainless steel (DC04) were used.

Thereafter the release paper still remaining on the diecuts was removed.

Next, test specimens of aluminium with the same dimensions of 100.0 mm×25.0 mm×2.0 mm were placed in each case flush with one end in such a way as to result in each case in an overlapping assembly as described in DIN EN 1465. The length of overlap was 312.5 mm in each case. The area of overlap was 12.5 mm² in each case. The overlapping assemblies were placed onto a metal sheet, with shims ensuring that the upper test specimen was unable to tip. A weight of 1 kg was placed on the upper test specimen in the region of the overlap area in each case. The assembly was subjected to the pressure of the weight for 5 minutes in each case at room temperature (pressing time). The weight was then removed.

Immediately after that, the lap shear strength was measured on those samples for which the lap shear strength before thermal vulcanization was of interest.

The bonded assemblies of the other samples, for which the lap shear strength after thermal vulcanization was of interest, were vulcanized for 30 minutes in each case at 180° C., at 200° C. and at 220° C. In the course of this operation there was a curing reaction within the adhesive tape layer samples, and there was a developing strong adhesion between the respective adhesive tape layer samples and the respective test specimens. Adhesive bonding therefore took place, with a considerable increase in strength. The tensile shear strength was determined after cooling and after a waiting time of two to three hours. The determination was made respectively at room temperature, −20° C. and +80° C.

Determining the tensile shear strength of overlap bonds allows statements to be made about the extent to which a double-sidedly adhesive product can be subject to shearing load. The determination was made in accordance with DIN EN 1465 by means of a tensile testing machine. The test velocity was 10 mm/min. All measurements were carried out in a conditioned chamber at 23° C. and 50% relative humidity.

Static Shear Test During Thermal Vulcanization

Sample preparation for the static shear test during thermal vulcanization was initially similar to that for the dynamic shear test. Rectangular diecuts with dimensions of 25.0 mm×12.5 mm were punched from a layer 1.2 mm thick of the shaped, chemically precrosslinked, thermally vulcanizable pressure-sensitive adhesive of the invention, lined on both sides with a release paper in each case. The release papers were subsequently removed in each case from one side of a diecut.

The diecuts were placed congruently in each case onto the end of a test specimen of stainless steel (DC04) with dimensions of 100.0 mm×25.0 mm×2.0 mm. The diecuts now adhered in each case to this test specimen. Thereafter the release paper still remaining on the diecuts was removed.

Next, test specimens of aluminium with the same dimensions of 100.0 mm×25.0 mm×2.0 mm were placed in each case flush with one end in such a way as to result in each case in an overlapping assembly as described in DIN EN 1465. The length of overlap was 12.5 mm in each case. The area of overlap was 312.5 mm² in each case.

The overlapping assemblies were placed onto a metal sheet, with shims ensuring that the upper test specimen was unable to tip. A weight of 500 g was placed on the upper test specimen in the region of the overlap area in each case. The assembly was subjected to the pressure of the weight for 5 minutes in each case at room temperature (pressing time). The weight was then removed.

Subsequently, these assemblies thus produced were suspended vertically in an oven preheated to 200° C., and exposed immediately to a constant shearing load of 200 g over a time of 30 minutes. Measurements were made of the slip distance of the diecuts, in mm.

The supplier of all of the stated test specimens was Rocholl GmbH.

Thickness

The thickness measurements took place in accordance with the test protocol of PSTC-33, using a thickness measurement apparatus from Wolf-Messtechnik GmbH. The applied force of the disc on the adhesive strips under measurement was 0.3 N or 4 N. The diameter of the disc was 10 mm.

The meltable, pressure-sensitively adhesive, hydroxyl-functionalized polybutadiene-polyurethane prepolymers were manufactured in laboratory batches in a heatable and evacuatable 1 litre planetary mixer from PC-Laborsystem. They were produced in each case by first weighing out the polybutadiene-diols and -polyols into the mixing canisters and carrying out mixing under reduced pressure at a temperature of 80° C. for two hours, accompanied by degassing, with residual moisture being removed accordingly. The chain extender was then added and was incorporated by mixing for 20 minutes without reduced pressure. Thereafter the remaining substances, such as, for example, the catalyst and/or the epoxy resin were added in accordance with the proportions indicated in the individual examples, and incorporated by mixing for 20 minutes. During this time the mixture was cooled down to 50° C.

Then the external cooling/heating was shutoff and the addition was made of the at least one aliphatic or alicyclic diisocyanate, which was incorporated homogeneously by mixing for 30 minutes with the temperature climbing because of the heat reaction to approximately 70° C. The mixture was then heated to 90° C. and stirred for 2.5 hours more, the last of these hours under reduced pressure. The mixing canister was removed from the mixer and given an airtight closure, and the mixture was left to stand in this vessel at 23° C. for 7 days for the purpose of completing the reaction.

To produce the chemically precrosslinked, thermally vulcanizable PSA of the invention and to produce the adhesive tape comprising said pressure-servitive adhesive, the one-week storage time was followed by the admixing of the further substances, such as, in particular, the ground sulfur, optionally the vulcanization accelerators, fillers, and also the further substances to the meltable polybutadiene-polyurethane thus produced, these additions taking place at 40° C. to 80° C. in the same apparatus. For homogeneous incorporation of the substances, they were mixed in for approximately two hours. During the second hour, reduced pressure was applied in order to remove moisture and air incorporated by stirring.

Then, to achieve the precrosslinking, an aliphatic or alicyclic polyisocyanate having an isocyanate functionality of three or greater than three was added and was incorporated by mixing for five minutes without reduced pressure. Then reduced pressure was applied and stirring was continued for five minutes at medium speed. Immediately after the admixing of the polyisocyanate, the precrosslinking reaction begins, and progresses slowly. However, there is still a time window of several minutes that is long enough for the chemically reacting mixture to be pressed to form a film.

Pressing to form films in the desired thickness took place between two glass plates preheated to 90° C. and lined with siliconized polyester films. After this shaping, the films were cooled to room temperature, causing them to undergo immediate solidification. The films were given airtight and moisture-tight packaging and stored for at least one week at room temperature prior to testing to determine completion of the precrosslinking reaction.

Some of the meltable, pressure-sensitively adhesive, hydroxyl-functionalized polybutadiene-polyurethane prepolymers were alternatively fabricated in a conventional heatable and evacuatable 200 litre mixing vessel with dissolver-stirrer from Molteni. They were each produced by first weighing out the polybutadiene-diols and -polyols and mixing them under reduced pressure at a temperature of 80° C. for two hours. Then the chain extender was added and was incorporated by mixing without reduced pressure for 20 minutes. The remaining substances, for example the catalyst and/or the epoxy resin, were then added according to the profortions indicated in the individual examples and incorporated by mixing for 2.0 minutes. During this, the mixture was cooled down to 50° C. The external cooling/heating was then shut off and the at least one aliphatic or alicyclic diisocyanate was added, and was incorporated homogeneously by mixing for 30 minutes, with the temperature climbing because of the heat of reaction to approximately 70° C. The mixture was then heated to 90° C. and stirred for 2.5 hours more, the last hour under reduced pressure. The mixture was run off into a 200-litre drum, which was given an airtight closure, and the mixture was left to stand in this vessel at 23° C. for 7 days for the completion of the reaction.

For the production of the chemically precrosslinked, thermally vulcanizable PSA of the invention and of the adhesive tape comprising said PSA, after the one-week storage time, the meltable, pressure-sensitively adhesive, hydroxyl-functionalized polybutadiene-polyurethane prepolymers thus produced were pumped by means of a drum melt pump at 40° C.–80° C. into a twin-screw extruder from Krauss Maffei Berstorff with the extruder designation ZE30Rx54D UTXmi. The extruder was heated electrically from the outside to about 40° C. to 80° C. and was air-cooled with a variety of fans. It was designed so as to ensure effective commixing of the polybutadiene-polyurethane prepolymers with the ground sulfur, optionally the vulcanization accelerators, fillers, and also the further substances, in a short residence time in the extruder. For this purpose, the mixing shatts of the twin-screw extruder were arranged in such a way that conveying elements alternated with mixing elements. The further substances were added with suitable metering equipment, using metering aids, into the unpressurized conveying zones of the twin-screw extruder. The metered addition of the aliphatic or alicyclic polyisocyanate having an isocyanate functionality of three or greater than three, to achieve the precrosslinking, took place last. This metered addition may optionally also take place in a second operation in the extruder.

The precrosslinking reaction commences immediately after the metered addition of the polyisocyanate, and progresses slowly.

After the emergence (exit: circular die 5 mm in diameter) from the twin-screw extruder of the mixture, which was at a temperature of around 40° C. to 80° C., it was shaped to form a film directly by means of a downstream two-roll applicator, between two incoming, double-sidedly siliconized polyester films 50 μm thick. The feed rate was varied between 1 m/min and 20 m/min. One of the incoming, double-sidedly siliconized polyester films was removed again immediately after the film had cooled and therefore solidified. The present film was subsequently wound up onto a cylindrical core. This film is the adhesion tape of the invention comprising the chemically precrosslinked, thermally vulcanizable PSA. The film was packaged with airtight and moisture-tight packaging and stored at room temperature for at least one week before the testing for completion of the precrosslinking reaction.

Table 1 lists the base materials (raw materials) used in the production of the meltable, pressure-sensitively adhesive, hydroxyl-functionalized polybutadiene-polyurethane prepolymers, in each case with tradename, manufacturer and the technical data relevant to this invention.

Table 2 lists the base materials (raw materials) used additionally for the chemically precrosslinked, thermally vulcanizable PSAs of the invention produced therefrom and for the adhesive tapes comprising these PSAs. The stated raw materials are all freely available commercially.

TABLE 1

Base materials (raw materials) used in producing the meltable, pressure-sensitively adhesive, hydroxyl-functionalized polybutadiene-polyurethane prepolymers

| Tradename | Description | Average number-averaged molar mass $M_n$ (g/mol) | OH or NCO number (mmol OH/kg or mmol NCO/kg) | Average, number-averaged functionality f | Manufacturer/ Supporter |
|---|---|---|---|---|---|
| Polybutadiene-polyols | | | | | |
| Krasol LBH 2000 ® | Polybutadiene-diol | 2100 | 910 | 1.9 | Cray Valley |
| Poly bd R-45 HTLO ® | Polybutadiene-polyol, f greater than 2 | 2800 | 840 | 2.4 | Cray Valley |
| Chain extender | | | | | |
| 2-Ethyl-1,3-hexandiol (EHD) | CAS No.: 94-96-2, diol | 146.2 | 13 677 | 2.0 | Sigma-Aldrich |
| Diisocyanates | | | | | |
| Vestanat IPDI ® | Isophorone diisocyanate (IPDI), CAS No.: 4098-71-9 | 222.3 | 8998 | 2.0 | Evonik |
| Desmodur W ® | Dicyclohexylmethane diiso-cyanate (HMDI), CAS No.: 5124-30-1 | 262 | 7571 | 2.0 | Covestro |
| Catalyst | | | | | |
| Coscat 83 ® | Bismuth trisneodecanoate CAS No.: 34364-26-6 | | | | Caschem |
| Epoxy resins | | | | | |
| Epikote 828 ® | Reaction product of bisphenol A and epichlorhydrin CAS No.: 25068-38-6 | | | | Brenntag |

TABLE 2

Base materials (raw materials) used in producing the chemically precrosslinked, thermally vulcanizable PSAs of the invention and the adhesive tapes comprising these PSAs and also for producing the comparative examples

| Tradename | Description | Manufacturer/ Supplier |
|---|---|---|
| Vulcanization agents and accelerators | | |
| Ground sulfur 80/90° | Soluble ground sulfur, CAS No.: 7704-34-9 | Avokal GmbH |
| Avosulf ® IS 75 S | Insoluble ground sulfur, CAS-No.: 9035-99-8 | Avokal GmbH |
| MBTS | Di(benzothiazyl) disulfide, CAS No.: 120-78-5 | Weber & Schaer GmbH |
| Fillers | | |
| Talkum Pharma M ® | Talc, CAS No.: 14807-96-6, spec, surface area: 4.6 $m^2/g$ | Scheruhn GmbH |
| Omyacarb 5-GU ® | Ground chalk, average particle diameter: 5.5 µm | Omya |
| Rapidquell ® Quicklime CL 90-Q | Calcium oxide, sieving residue > 90 µm: 3 mass % | Rheinkalk GmbH |
| Kaolin Pharma ® | Ground kaolin, sieving residue > 45 µm: 0.1%, kaolinite: 88.0% | Heinrich Heller GmbH |
| Auxiliaries and adjuvants | | |
| Anox 20 ® | Pentaerythritol tetrakis(3-(3,5-di-tert-butyl-4-hydroxyphenyl)propionate), CAS number: 6683-19-8, Antioxidant | Addivant |

TABLE 2-continued

Base materials (raw materials) used in producing the chemically precrosslinked, thermally vulcanizable PSAs of the invention and the adhesive tapes comprising these PSAs and also for producing the comparative examples

| Tradename | Description | Manufacturer/Supplier |
|---|---|---|
| Polyisocyanates for precrosslinking | | |
| Desmodur N 3300 ® | Mixture of aliphatic polyisocyanates based on hexamethylene diisocyanate with an isocyanate functionality of in each case three or greater than three, NCO number: 5190 mmol NCO/kg | Covestro |
| Desmodur N 3400 ® | Mixture of aliphatic polyisocyanates based on hexamethylene diisocyanate, trifunctional isocyanurate fraction: 11% (amount-of-substance fraction), NCO number: 5190 mmol NCO/kg | Covestro |

EXAMPLES

Inventive Example 1

The chemical reaction to form the meltable, pressure-sensitively adhesive, hydroxyl-functionalized polybutadiene-polyurethane prepolymer took place in the presence of an epoxy resin. The composition of the polybutadiene-polyurethane prepolymer (Prepo 1), including the epoxy resin, is as follows:

Composition of Prepo 1:

| Raw material | Weight fraction [wt %] | Number of OH or NCO groups introduced, based on percentage weight fraction | Percentage ratio of number of OH groups to one another |
|---|---|---|---|
| Krasol LBH 2000 ® | 29.55 | 26.89 mmol OH | 20 |
| Poly bd R-45 HTLO ® | 32.02 | 26.89 mmol OH | 20 |
| 2-Ethyl-1,3-hexanediol | 5.90 | 80.68 mmol OH | 60 |
| Epikote 828 ® | 20.00 | | |
| Coscat 83 ® | 0.10 | | |
| Desmodur W ® | 12.43 | 94.13 mmol NCO | |
| Total | 100.00 | | |

Production took place in a laboratory batch (1 litre). The weight ratio of Desmodur W® is calculated so that the NCO/OH ratio of the polyurethane prepolymer is 0.70. The theoretical gel point is computed to be 0.83.

Prepo 1 is meltable and at room temperature in terms of consistency is rubber-like and tacky. The test results are summarized in the table below.

Test Results for Prepo 1 (Including Epoxy Resin):

| | |
|---|---|
| G' (at 1 rad/sec and 23° C.) | 590 Pa |
| G" (at 1 rad/sec and 23° C.) | 3100 Pa |
| G' (at 10 rad/sec and 23° C.) | 7600 Pa |
| G" (at 10 rad/sec and 23° C.) | 20 400 Pa |
| Complex viscosity η* at 10 rad/sec and 23° C. | 3200 Pas |
| Complex viscosity η* at 10 rad/sec and 80° C. | 18 Pas |

Production of the Inventive Chemically Precrosslinked, Thermally Vulcanizable Pressure-Sensitive Adhesive and of the Adhesive Tape Comprising this PSA:

For producing the inventive PSA and the inventive adhesive tape, Prepo 1 (including epoxy resin) was blended further in a laboratory batch in accordance with the formula below, and shaped to form a film. The epoxy resin, already incorporated by mixing during the production of the polybutadiene-polyurethane prepolymer, is listed separately in the following table.

Composition of the chemically precrosslinked, thermally vulcanizable PSA based on Prepo 1:

| Raw material | Weight fraction [wt %] | OH-functionalized and NCO-functionalized raw materials introduced into the Prepo 1 preparation | Weight fraction [wt %] | Number of OH or NCO groups introduced, based on percentage weight fraction |
|---|---|---|---|---|
| Prepo 1 (excluding epoxy resin) | 43.20 | Krasol LBH 2000 ® | 15.96 | 14.52 |
| | | Poly bd R-45 HTLO ® | 17.29 | 14.52 |
| | | 2-Ethyl-1,3-hexanediol | 3.19 | 43.57 |
| | | Desmodur W | 6.71 | 50.83 |
| Epikote 828 ® (from Prepo 1 preparation) | 10.80 | | | |
| Ground sulfur 80/90° | 1.20 | | | |
| MBTS | 2.00 | | | |
| Rapidquell ® Quicklime CL 90-Q | 15.00 | | | |
| Talkum Pharma M ® | 10.00 | | | |
| Omyacarb 5-GU ® | 15.20 | | | |
| Anox 20 ® | 0.50 | | | |
| Desmodur N 3300 ® | 2.10 | | | 10.89 |

The percentage weight fraction of Desmodur N 3300® was selected such that the ratio of the total number of isocyanate groups introduced into the preparation of the chemically precrosslinked, thermally vulcanizable PSA to the total number of hydroxyl groups introduced in the preparation (total NCO/OH ratio) was 0.85.

The results achieved were as follows:

Before Thermal Vulcanization:

| Test method | Substrate | Shearing load | Result | Fracture mode |
|---|---|---|---|---|
| Peel adhesion | Steel | | 7.5 N/cm | |
| Peel adhesion | Aluminium | | 1.4 N/cm | |
| Dynamic L-jig test | Steel | | 115 N/cm | |
| Static shear test | Steel | 500 g | >20 000 minutes | |
| Static shear test | Aluminium | 500 g | 5700 minutes | |
| Dynamic shear test (lap shear strength) | Steel against aluminium | | 0.3 MPa | adhesive to aluminium |

During Thermal Vulcanization:

| Test method | Substrate | Overlap area | Shearing load | Vulcanization conditions | Result |
|---|---|---|---|---|---|
| Static shear test | Steel against aluminium | 312.5 mm² | 200 g | 30 minutes/200° C. | Slip distance: 2-4 mm |

After Thermal Vulcanization:

Dynamic Shear Test (Lap Shear Strength), Bonded Substrates: Steel Against Aluminium

| Vulcanization conditions | Temperature during measurement [° C.] | Result [MPa] | Fracture mode |
|---|---|---|---|
| 30 min/180° C. | −20 | 6.9 | cohesive |
| | +23 | 2.9 | cohesive |
| | +80 | 0.5 | cohesive |
| 30 min/200° C. | −20 | 8.4 | cohesive |
| | +23 | 4.0 | cohesive |
| | +80 | 0.8 | cohesive |
| 30 min/220° C. | −20 | 8.7 | cohesive |
| | +23 | 4.0 | cohesive |
| | +80 | 0.9 | cohesive |

Inventive Example 2

The chemical reaction to form the meltable, pressure-sensitively adhesive, hydroxyl-functionalized polybutadiene-polyurethane prepolymer took place in the presence of an epoxy resin. The composition of the polybutadiene-polyurethane prepolymer (Prepo 2), including the epoxy resin, is as follows:

Composition of Prepo 2:

| Raw material | Weight fraction [wt %] | Number of OH or NCO groups introduced, based on percentage weight fraction | Percentage ratio of number of OH groups to one another |
|---|---|---|---|
| Krasol LBH 2000 ® | 60.98 | 55.50 mmol OH | 40 |
| 2-Ethyl-1,3-hexanediol | 6.09 | 83.25 mmol OH | 60 |
| Epikote 828 ® | 20.00 | | |
| Coscat 83 ® | 0.10 | | |
| Desmodur W ® | 12.83 | 97.12 mmol NCO | |
| Total | 100.00 | | |

Production took place in a laboratory batch (1 litre). The weight ratio of Desmodur W® is calculated so that the NCO/OH ratio of the polyurethane prepolymer is 0.70. A theoretical gel point does not exist.

Prepo 2 is meltable and at room temperature in terms of consistency is rubber-like and tacky. The test results are summarized in the table below.

Test Results for Prepo 2 (Including Epoxy Resin):

| | |
|---|---|
| G' (at 1 rad/sec und 23° C.) | 550 Pa |
| G" (at 1 rad/sec und 23° C.) | 2900 Pa |
| G' (at 10 rad/sec und 23° C.) | 7200 Pa |
| G" (at 10 rad/sec und 23° C.) | 20 000 Pa |
| Complex viscosity η* at 10 rad/sec and 23° C. | 3050 Pas |
| Complex viscosity η* at 10 rad/sec and 80° C. | 17 Pas |

Production of the Inventive Chemically Precrosslinked, Thermally Vulcanizable Pressure-Sensitive Adhesive and of the Adhesive Tape Comprising this PSA:

For producing the inventive PSA and the inventive adhesive tape, Prepo 2 (including epoxy resin) was blended further in a laboratory batch in accordance with the formula below, and shaped to form a film. The epoxy resin, already incorporated by mixing during the production of the polybutadiene-polyurethane prepolymer, is listed separately in the following table.

Composition of the Chemically Precrosslinked, Thermally Vulcanizable PSA Based on Prepo 2:

| Raw material | Weight fraction [wt %] | OH-functionalized and NCO-functionalized raw materials introduced into the Prepo 2 preparation | Weight fraction [wt %] | Number of OH or NCO groups introduced, based on percentage weight fraction |
|---|---|---|---|---|
| Prepo 2 (excluding epoxy resin) | 43.20 | Krasol LBH 2000 ® | 32.93 | 29.97 |
| | | 2-Ethyl-1,3-hexanediol | 3.29 | 44.95 |
| | | Desmodur W ® | 6.93 | 52.44 |
| Epikote 828 ® (from Prepo 2 preparation) | 10.80 | | | |
| Ground sulfur 80/90° | 1.20 | | | |
| MBTS | 2.00 | | | |
| Rapidquell ® Quicklime CL 90-Q | 15.00 | | | |
| Talkum Pharma M ® | 10.00 | | | |
| Omyacarb 5-GU ® | 15.13 | | | |
| Anox 20 ® | 0.50 | | | |
| Desmodur N 3300 ® | 2.17 | | | 11.24 |

The percentage weight fraction of Desmodur N 3300® was selected such that the ratio of the total number of isocyanate groups introduced into the preparation of the chemically precrosslinked, thermally vulcanizable PSA into the total number of hydroxyl groups introduced in the preparation (total NCO/OH ratios) was 0.85.

The results achieved were as follows:

Before Thermal Vulcanization:

| Test method | Substrate | Shearing load | Result | Fracture mode |
|---|---|---|---|---|
| Peel adhesion | Steel | | 9.1 N/cm | |
| Peel adhesion | Aluminium | | 1.8 N/cm | |
| Dynamic L-jig test | Steel | | 125 N/cm | |

-continued

| Test method | Substrate | Shearing load | Result | Fracture mode |
|---|---|---|---|---|
| Static shear test | Steel | 500 g | 9000 minutes | |
| Static shear test | Aluminium | 500 g | 2100 minutes | |
| Dynamic shear test (lap shear strength) | Steel against aluminium | | 0.2 MPa | adhesive to aluminium |

During Thermal Vulcanization:

| Test method | Substrate | Overlap area | Shearing load | Vulcanization conditions | Result |
|---|---|---|---|---|---|
| Static shear test | Steel against aluminium | 312.5 mm² | 200 g | 30 minutes/200° C. | Slip distance: 9-11 mm |

After Thermal Vulcanization:
Dynamic Shear Test (Lap Shear Strength), Bonded Substrates: Steel Against Aluminium

| Vulcanization conditions | Temperature during measurement [° C.] | Result [MPa] | Fracture mode |
|---|---|---|---|
| 30 min/180° C. | −20 | 6.4 | cohesive |
| | +23 | 2.6 | cohesive |
| | +80 | 0.4 | cohesive |
| 30 min/200° C. | −20 | 8.0 | cohesive |
| | +23 | 3.8 | cohesive |
| | +80 | 0.7 | cohesive |
| 30 min/220° C. | −20 | 8.9 | cohesive |
| | +23 | 4.1 | cohesive |
| | +80 | 1.0 | cohesive |

Inventive Example 3

The composition of the meltable, pressure-sensitively adhesive, hydroxyl-functionalized polybutadiene-polyurethane prepolymer (Prepo 3) is as follows:
Composition of Prepo 3:

| Raw material | Weight fraction [wt %] | Number of OH or NCO groups introduced, based on percentage weight fraction | Percentage ratio of number of OH groups to one another |
|---|---|---|---|
| Krasol LBH 2000 ® | 76.25 | 69.39 mmol OH | 40 |
| 2-Ethyl-1,3-hexanediol | 7.61 | 104.08 mmol OH | 60 |
| Coscat 83 ® | 0.10 | | |
| Desmodur W ® | 16.04 | 121.43 mmol NCO | |
| Total | 100.00 | | |

Production took place in a laboratory batch (1 litre). The weight ratio of Desmodur W® is calculated so that the NCO/OH ratio of the polyurethane prepolymer is 0.70. A theoretical gel point does not exist.

Prepo 3 is meltable and at room temperature in terms of consistency is rubber-like and tacky. The test results are summarized in the table below.

Test Results for Prepo 3:

| | |
|---|---|
| G' (at 1 rad/sec and 23° C.) | 12 000 Pa |
| G" (at 1 rad/sec and 23° C.) | 21 000 Pa |
| G' (at 10 rad/sec and 23° C.) | 41 000 Pa |
| G" (at 10 rad/sec and 23° C.) | 52 000 Pa |
| Complex viscosity η* at 10 rad/sec and 23° C. | 12 100 Pas |
| Complex viscosity η* at 10 rad/sec and 80° C. | 62 Pas |

Production of the inventive chemically precrosslinked, thermally vulcanizable pressure-sensitive adhesive and of the adhesive tape comprising this PSA:

For producing the inventive PSA and the inventive adhesive tape, Prepo 3 was blended further in a laboratory batch in accordance with the formula below, and shaped to form a film.

Composition of the chemically precrosslinked, thermally vulcanizable PSA based on Prepo 3:

| Raw material | Weight fraction [wt %] | OH-functionalized and NCO-functionalized raw materials introduced into the Prepo 3 preparation | Weight fraction [wt %] | Number of OH or NCO groups introduced, based on percentage weight fraction |
|---|---|---|---|---|
| Prepo 3 | 54.00 | Krasol LBH 2000 ® | 41.18 | 37.47 |
| | | 2-Ethyl-1,3-hexanediol | 4.11 | 56.20 |

| Raw material | Weight fraction [wt %] | OH-functionalized and NCO-functionalized raw materials introduced into the Prepo 3 preparation | Weight fraction [wt %] | Number of OH or NCO groups introduced, based on percentage weight fraction |
|---|---|---|---|---|
| | | Desmodur W ® | 8.66 | 65.57 |
| Ground sulfur 80/90° | 1.20 | | | |
| MBTS | 2.00 | | | |
| Rapidquell ® Quicklime CL 90-Q | 15.00 | | | |
| Talkum Pharma M ® | 10.00 | | | |
| Omyacarb 5-GU ® | 14.59 | | | |
| Anox 20 ® | 0.50 | | | |
| Desmodur N 3300 ® | 2.71 | | | 14.05 |

The percentage weight fraction of Desmodur N 3300® was selected such that the ratio of the total number of isocyanate groups introduced into the preparation of the chemically precrosslinked, thermally vulcanizable PSA to the total number of hydroxyl groups introduced in the preparation (total NCO/OH ratio) was 0.85.

The results achieved were as follows:

Before Thermal Vulcanization:

| Test method | Substrate | Shearing load | Result | Fracture mode |
|---|---|---|---|---|
| Peel adhesion | Steel | | 2.4 N/cm | |
| Peel adhesion | Aluminium | | 0.5 N/cm | |
| Dynamic L-jig test | Steel | | 35 N/cm | |
| Static shear test | Steel | 500 g | 6000 minutes | |
| Static shear test | Aluminium | 500 g | 1400 minutes | |
| Dynamic shear test (lap shear strength) | Steel against aluminium | | 0.2 MPa | adhesive to aluminium |

During Thermal Vulcanization:

| Test method | Substrate | Overlap area | Shearing load | Vulcanization conditions | Result |
|---|---|---|---|---|---|
| Static shear test | Steel against aluminium | 312.5 mm² | 200 g | 30 minutes/200° C. | Slip distance: 5-7 mm |

After Thermal Vulcanization:

Dynamic Shear Test (Lap Shear Strength), Bonded Substrates: Steel Against Aluminium

| Vulcanization conditions | Temperature during measurement[° C.] | Result [MPa] | Fracture mode |
|---|---|---|---|
| 30 min/180° C. | −20 | not determined | |
| | +23 | 1.7 | Adhesive |
| | +80 | not determined | |
| 30 min/200° C. | −20 | 5.4 | Adhesive |
| | +23 | 2.0 | Adhesive |
| | +80 | 0.3 | Adhesive |
| 30 min/220° C. | −20 | not determined | |
| | +23 | 3.1 | Cohesive and adhesive |
| | +80 | not determined | |

Inventive Example 4

The chemical reaction to form the meltable, pressure-sensitively adhesive, hydroxyl-functionalized polybutadiene-polyurethane prepolymer took place in the presence of an epoxy resin. The composition of the polybutadiene-polyurethane prepolymer (Prepo 4), including the epoxy resin, is as follows:

Composition of Prepo 4:

| Raw material | Weight fraction [wt %] | Number of OH or NCO groups introduced, based on percentage weight fraction | Percentage ratio of number of OH groups to one another |
|---|---|---|---|
| Krasol LBH 2000 ® | 30.30 | 27.57 mmol OH | 20 |
| Poly bd R-45 HTLO ® | 32.82 | 27.57 mmol OH | 20 |
| 2-Ethyl-1,3-hexanediol | 6.05 | 82.72 mmol OH | 60 |
| Epikote 828 ® | 20.00 | | |
| Coscat 83 ® | 0.10 | | |
| Vestanat IPDI ® | 10.73 | 96.51 mmol NCO | |
| Total | 100.00 | | |

Production took place in a laboratory batch (1 litre). The weight ratio of Vestanat IPDI® is calculated so that the NCO/OH ratio of the polyurethane prepolymer is 0.70. The theoretical gel point is computed to be 0.83.

Prepo 4 is meltable and at room temperature in terms of consistency is rubber-like and tacky. The test results are summarized in the table below.

Test Results for Prepo 4 (Including Epoxy Resin):

| | |
|---|---|
| G' (at 1 rad/sec and 23° C.) | 570 Pa |
| G'' (at 1 rad/sec and 23° C.) | 2900 Pa |
| G' (at 10 rad/sec and 23° C.) | 7100 Pa |
| G'' (at 10 rad/sec and 23° C.) | 19 800 Pa |
| Complex viscosity η* at 10 rad/sec and 23° C. | 2900 Pas |
| Complex viscosity η* at 10 rad/sec and 80° C. | 16 Pas |

Production of the inventive chemically precrosslinked, thermally vulcanizable pressure-sensitive adhesive and of the adhesive tape comprising this PSA:

For producing the inventive PSA and the inventive adhesive tape, Prepo 4 (including epoxy resin) was blended further in a laboratory batch in accordance with the formula below, and shaped to form a film. The epoxy resin, already incorporated by mixing during the production of the polybutadiene-polyurethane prepolymer, is listed separately in the following table.

Composition of the chemically precrosslinked, thermally vulcanizable PSA based on Prepo 4:

| Raw material | Weight fraction [wt %] | OH-functionalized and NCO-functionalized raw materials introduced into the Prepo 4 preparation | Weight fraction [wt %] | Number of OH or NCO groups introduced, based on percentage weight fraction |
|---|---|---|---|---|
| Prepo 4 (excluding epoxy resin) | 43.20 | Krasol LBH 2000 ® | 16.36 | 14.89 |
| | | Poly bd R-45 HTLO ® | 17.73 | 14.89 |
| | | 2-Ethyl-1,3-hexanediol | 3.27 | 44.67 |
| | | Vestanat IPDI ® | 5.79 | 52.11 |
| Epikote 828 ® (from Prepo 4 preparation) | 10.80 | | | |
| Ground sulfur 80/90° | 1.20 | | | |
| MBTS | 2.00 | | | |
| Rapidquell ® Quicklime CL 90-Q | 15.00 | | | |
| Talkum Pharma M ® | 10.00 | | | |
| Omyacarb 5-GU ® | 15.15 | | | |
| Anox 20 ® | 0.50 | | | |
| Desmodur N 3300 ® | 2.15 | | | 11.17 |

The percentage weight fraction of Desmodur N 3300® was selected such that the ratio of the total number of isocyanate groups introduced into the preparation of the chemically precrosslinked, thermally vulcanizable PSA to the total number of hydroxyl groups introduced in the preparation (total NCO/OH ratio) was 0.85.

The results achieved were as follows:

Before Thermal Vulcanization:

| Test method | Substrate | Shearing load | Result | Fracture mode |
|---|---|---|---|---|
| Peel adhesion | Steel | | 7.9 N/cm | |
| Peel adhesion | Aluminium | | 1.8 N/cm | |
| Dynamic L-jig test | Steel | | 109 N/cm | |
| Static shear test | Steel | 500 g | 15 000 minutes | |
| Static shear test | Aluminium | 500 g | 5100 minutes | |

| Test method | Substrate | Shearing load | Result | Fracture mode |
|---|---|---|---|---|
| Dynamic shear test (lap shear strength) | Steel against aluminium | | 0.2 MPa | adhesive to aluminium |

During Thermal Vulcanization:

| Test method | Substrate | Overlap area | Shearing load | Vulcanization conditions | Result |
|---|---|---|---|---|---|
| Static shear test | Steel against aluminium | 312.5 mm² | 200 g | 30 minutes/ 200° C. | Slip distance: 3-4 mm |

After Thermal Vulcanization:
Dynamic Shear Test (Lap Shear Strength), Bonded Substrates: Steel Against Aluminium

| Vulcanization conditions | Temperature during measurement[° C.] | Result [MPa] | Fracture mode |
|---|---|---|---|
| 30 min/180° C. | −20 | 7.2 | cohesive |
| | +23 | 2.8 | cohesive |
| | +80 | 0.4 | cohesive |
| 30 min/200° C. | −20 | 8.8 | cohesive |
| | +23 | 4.3 | cohesive |
| | +80 | 0.9 | cohesive |
| 30 min/220° C. | −20 | 8.8 | cohesive |
| | +23 | 4.2 | cohesive |
| | +80 | 0.7 | cohesive |

Inventive Example 5

The chemical reaction to form the meltable, pressure-sensitively adhesive, hydroxyl-functionalized polybutadiene-polyurethane prepolymer took place in the presence of an epoxy resin. The composition of the polybutadiene-polyurethane prepolymer (Prepo 5), including the epoxy resin, is as follows:

Composition of Prepo 5:

| Raw material | Weight fraction [wt %] | Number of OH or NCO groups introduced, based on percentage weight fraction | Percentage ratio of number of OH groups to one another |
|---|---|---|---|
| Krasol LBH 2000 ® | 14.55 | 13.24 mmol OH | 10 |
| Poly bd R-45 HTLO ® | 47.30 | 39.73 mmol OH | 30 |
| 2-Ethyl-1,3-hexanediol | 5.81 | 79.46 mmol OH | 60 |
| Epikote 828 ® | 20.00 | | |
| Coscat 83 ® | 0.10 | | |
| Desmodur W ® | 12.24 | 92.70 mmol NCO | |
| Total | 100.00 | | |

Production took place in a laboratory batch (1 litre). The weight ratio of Desmodur W® is calculated so that the NCO/OH ratio of the polyurethane prepolymer is 0.70. The theoretical gel point is computed to be 0.77.

Prepo 5 is meltable and at room temperature in terms of consistency is rubber-like and tacky. The test results are summarized in the table below.

Test Results for Prepo 5 (Including Epoxy Resin):

| | |
|---|---|
| G' (at 1 rad/sec and 23° C.) | 610 Pa |
| G" (at 1 rad/sec and 23° C.) | 3300 Pa |
| G' (at 10 rad/sec and 23° C.) | 7800 Pa |
| G" (at 10 rad/sec and 23° C.) | 24 700 Pa |
| Complex viscosity $\eta^*$ at 10 rad/sec and 23° C. | 3800 Pas |
| Complex viscosity $\eta^*$ at 10 rad/sec and 80° C. | 25 Pas |

Production of the inventive chemically precrosslinked, thermally vulcanizable pressure-sensitive adhesive and of the adhesive tape comprising this PSA:

For producing the inventive PSA and the inventive adhesive tape, Prepo 5 (including epoxy resin) was blended further in a laboratory batch in accordance with the formula below, and shaped to form a film. The epoxy resin, already incorporated by mixing during the production of the polybutadiene-polyurethane prepolymer, is listed separately in the following table.

Composition of the chemically precrosslinked, thermally vulcanizable PSA based on Prepo 5:

| Raw material | Weight fraction [wt %] | OH-functionalized and NCO-functionalized raw materials introduced into the Prepo 5 preparation | Weight fraction [wt %] | Number of OH or NCO groups introduced, based on percentage weight fraction |
|---|---|---|---|---|
| Prepo 5 (excluding epoxy resin) | 43.20 | Krasol LBH 2000 ® | 7.86 | 7.15 |
| | | Poly bd R-45 HTLO ® | 25.54 | 21.45 |
| | | 2-Ethyl-1,3-hexanediol | 3.14 | 42.91 |
| | | Desmodur W ® | 6.61 | 50.06 |
| Epikote 828 ® (from Prepo 5 preparation) | 10.80 | | | |
| Ground sulfur 80/90° | 1.20 | | | |
| MBTS | 2.00 | | | |
| Rapidquell ® Quicklime CL 90-Q | 15.00 | | | |
| Talkum Pharma M ® | 10.00 | | | |
| Omyacarb 5-GU ® | 15.23 | | | |
| Anox 20 ® | 0.50 | | | |
| Desmodur N 3300 ® | 2.07 | | | 10.73 |

The percentage weight fraction of Desmodur N 3300® was selected such that the ratio of the total number of isocyanate groups introduced into the preparation of the chemically precrosslinked, thermally vulcanizable PSA to the total number of hydroxyl groups introduced in the preparation (total NCO/OH ratio) was 0.85.

The results achieved were as follows:

Before Thermal Vulcanization:

| Test method | Substrate | Shearing load | Result | Fracture mode |
|---|---|---|---|---|
| Peel adhesion | Steel | | 6.1 N/cm | |
| Peel adhesion | Aluminium | | 1.2 N/cm | |
| Dynamic L-jig test | Steel | | 81 N/cm | |
| Static shear test | Steel | 500 g | >20 000 minutes | |
| Static shear test | Aluminium | 500 g | 4900 minutes | |
| Dynamic shear test (lap shear strength) | Steel against aluminium | | 0.3 MPa | adhesive to aluminium |

During Thermal Vulcanization:

| Test method | Substrate | Overlap area | Shearing load | Vulcanization conditions | Result |
|---|---|---|---|---|---|
| Static shear test | Steel against aluminium | 312.5 mm² | 200 g | 30 minutes/ 200° C. | Slip distance: 2-4 mm |

After Thermal Vulcanization:
Dynamic Shear Test (Lap Shear Strength), Bonded Substrates: Steel Against Aluminium

| Vulcanization conditions | Temperature during measurement[° C.] | Result [MPa] | Fracture mode |
|---|---|---|---|
| 30 min/180° C. | −20 | 7.7 | cohesive |
| | +23 | 3.1 | cohesive |
| | +80 | 0.6 | cohesive |
| 30 min/200° C. | −20 | 8.7 | cohesive |
| | +23 | 4.4 | cohesive |
| | +80 | 0.8 | cohesive |
| 30 min/220° C. | −20 | 8.8 | cohesive |
| | +23 | 4.5 | cohesive |
| | +80 | 1.2 | cohesive |

Inventive Example 6

The meltable, pressure-sensitively adhesive, hydroxyl-functionalized polybutadiene-polyurethane prepolymer is Prepo 1 from Inventive Example 1.

Production of the inventive chemically precrosslinked, thermally vulcanizable pressure-sensitive adhesive and of the adhesive tape comprising this PSA:

For producing the inventive PSA and the inventive adhesive tape, Prepo 1 (including epoxy resin) was blended further in a laboratory batch in accordance with the formula below, and shaped to form a film. The epoxy resin, already incorporated by mixing during the production of the polybutadiene-polyurethane prepolymer, is listed separately in the following table.

Composition of the Chemically Precrosslinked, Thermally Vulcanizable PSA Based on Prepo 1:

| Raw material | Weight fraction [wt %] | OH-functionalized and NCO-functionalized raw materials introduced into the Prepo 1 preparation | Weight fraction [wt %] | Number of OH or NCO groups introduced, based on percentage weight fraction |
|---|---|---|---|---|
| Prepo 1 (excluding epoxy resin) | 43.20 | Krasol LBH 2000 ® | 15.96 | 14.52 |
| | | Poly bd R-45 HTLO ® | 17.29 | 14.52 |
| | | 2-Ethyl-1,3-hexanediol | 3.19 | 43.57 |
| | | Desmodur W ® | 6.71 | 50.83 |
| Epikote 828 ® (from Prepo 1 preparation) | 10.80 | | | |
| Ground sulfur 80/90° | 1.20 | | | |
| MBTS | 2.00 | | | |
| Rapidquell ® Quicklime CL 90-Q | 15.00 | | | |
| Talkum Pharma M ® | 10.00 | | | |
| Omyacarb 5-GU ® | 12.40 | | | |
| Anox 20 ® | 0.50 | | | |
| Desmodur N 3300 ® | 4.90 | | | 25.41 |

The percentage weight fraction of Desmodur N 3300® was selected such that the ratio of the total number of isocyanate groups introduced into the preparation of the chemically precrosslinked, thermally vulcanizable PSA to the total number of hydroxyl groups introduced in the preparation (total NCO/OH ratio) was 1.05.

The results achieved were as follows:

Before Thermal Vulcanization:

| Test method | Substrate | Shearing load | Result | Fracture mode |
|---|---|---|---|---|
| Peel adhesion | Steel | | 4.9 N/cm | |
| Peel adhesion | Aluminium | | 1.0 N/cm | |
| Dynamic L-jig test | Steel | | 79 N/cm | |
| Static shear test | Steel | 500 g | 6000 minutes | |
| Static shear test | Aluminium | 500 g | 2200 minutes | |
| Dynamic shear test (lap shear strength) | Steel against aluminium | | 0.1 MPa | adhesive to aluminium |

During Thermal Vulcanization:

| Test method | Substrate | Overlap area | Shearing load | Vulcanization conditions | Result |
|---|---|---|---|---|---|
| Static shear test | Steel against aluminium | 312.5 mm² | 200 g | 30 minutes/ 200° C. | Slip distance: 7-10 mm |

After Thermal Vulcanization:

Dynamic Shear Test (Lap Shear Strength), Bonded Substrates: Steel Against Aluminium

| Vulcanization conditions | Temperature during measurement[° C.] | Result [MPa] | Fracture mode |
|---|---|---|---|
| 30 min/180° C. | −20 | 6.7 | cohesive |
| | +23 | 2.8 | cohesive |
| | +80 | 0.6 | cohesive |
| 30 min/200° C. | −20 | 8.8 | cohesive |
| | +23 | 3.9 | cohesive |
| | +80 | 0.8 | cohesive |

-continued

| Vulcanization conditions | Temperature during measurement[° C.] | Result [MPa] | Fracture mode |
|---|---|---|---|
| 30 min/220° C. | −20 | 8.1 | cohesive |
| | +23 | 4.2 | cohesive |
| | +80 | 1.1 | cohesive |

Inventive Example 7

The meltable, pressure-sensitively adhesive, hydroxyl-functionalized polybutadiene-polyurethane prepolymer is Prepo 1 from Inventive Example 1.

Production of the inventive chemically precrosslinked, thermally vulcanizable pressure-sensitive adhesive and of the adhesive tape comprising this PSA:

For producing the inventive PSA and the inventive adhesive tape, Prepo 1 (including epoxy resin) was blended further in a laboratory batch in accordance with the formula below, and shaped to form a film. The epoxy resin, already incorporated by mixing during the production of the polybutadiene-polyurethane prepolymer, is listed separately in the following table.

Composition of the chemically precrosslinked, thermally vulcanizable PSA based on Prepo 1:

| Raw material | Weight fraction [wt %] | OH-functionalized and NCO-functionalized raw materials introduced into the Prepo 1 preparation | Weight fraction [wt %] | Number of OH or NCO groups introduced, based on percentage weight fraction |
|---|---|---|---|---|
| Prepo 1 (excluding epoxy resin) | 43.20 | Krasol LBH 2000 ® | 15.96 | 14.52 |
| | | Poly bd R-45 HTLO ® | 17.29 | 14.52 |
| | | 2-Ethyl-1,3-hexanediol | 3.19 | 43.57 |
| | | Desmodur W ® | 6.71 | 50.83 |
| Epikote 828 ® (from Prepo 1 preparation) | 10.80 | | | |
| Ground sulfur 80/90° | 1.20 | | | |
| MBTS | 2.00 | | | |
| Rapidquell ® Quicklime CL 90-Q | 15.00 | | | |
| Talkum Pharma M ® | 10.00 | | | |
| Omyacarb 5-GU ® | 13.80 | | | |
| Anox 20 ® | 0.50 | | | |
| Desmodur N 3400 ® | 3.50 | | | 18.15 |

The percentage weight fraction of Desmodur N 3400® was selected such that the ratio of the total number of isocyanate groups introduced into the preparation of the chemically precrosslinked, thermally vulcanizable PSA to the total number of hydroxyl groups introduced in the preparation (total NCO/OH ratio) was 0.95.

The results achieved were as follows:

Before Thermal Vulcanization:

| Test method | Substrate | Shearing load | Result | Fracture mode |
|---|---|---|---|---|
| Peel adhesion | Steel | | 9.9 N/cm | |
| Peel adhesion | Aluminium | | 2.3 N/cm | |
| Dynamic L-jig test | Steel | | 102 N/cm | |
| Static shear test | Steel | 500 g | 9500 minutes | |
| Static shear test | Aluminium | 500 g | 2800 minutes | |
| Dynamic shear test (lap shear strength) | Steel against aluminium | | 0.2 MPa | adhesive to aluminium |

During Thermal Vulcanization:

| Test method | Substrate | Overlap area | Shearing load | Vulcanization conditions | Result |
|---|---|---|---|---|---|
| Static shear test | Steel against aluminium | 312.5 mm² | 200 g | 30 minutes/ 200° C. | Slip distance: 3-6 mm |

After Thermal Vulcanization:
Dynamic Shear Test (Lap Shear Strength), Bonded Substrates: Steel Against Aluminium

| Vulcanization conditions | Temperature during measurement[° C.] | Result [MPa] | Fracture mode |
|---|---|---|---|
| 30 min/180° C. | −20 | 6.4 | cohesive |
| | +23 | 2.7 | cohesive |
| | +80 | 0.4 | cohesive |
| 30 min/200° C. | −20 | 8.8 | cohesive |
| | +23 | 4.1 | cohesive |
| | +80 | 0.9 | cohesive |
| 30 min/220° C. | −20 | 8.7 | cohesive |
| | +23 | 4.3 | cohesive |
| | +80 | 0.9 | cohesive |

Inventive Example 8

The meltable, pressure-sensitively adhesive, hydroxyl-functionalized polybutadiene-polyurethane prepolymer is Prepo 1 from Inventive Example 1.

Production of the inventive chemically precrosslinked, thermally vulcanizable pressure-sensitive adhesive and of the adhesive tape comprising this PSA:

For producing the inventive PSA and the inventive adhesive tape, Prepo 1 (including epoxy resin) was blended further in a laboratory batch in accordance with the formula below, and shaped to form a film. The epoxy resin, already incorporated by mixing during the production of the polybutadiene-polyurethane prepolymer, is listed separately in the following table.

Composition of the chemically precrosslinked, thermally vulcanizable PSA based on Prepo 1:

| Raw material | Weight fraction [wt %] | OH-functionalized and NCO-functionalized raw materials introduced into the Prepo 1 preparation | Weight fraction [wt %] | Number of OH or NCO groups introduced, based on percentage weight fraction |
|---|---|---|---|---|
| Prepo 1 (excluding epoxy resin) | 43.20 | Krasol LBH 2000 ® | 15.96 | 14.52 |
| | | Poly bd R-45 HTLO ® | 17.29 | 14.52 |
| | | 2-Ethyl-1,3-hexanediol | 3.19 | 43.57 |
| | | Desmodur W ® | 6.71 | 50.83 |
| Epikote 828 ® (from Prepo 1 preparation) | 10.80 | | | |
| Ground sulfur 80/90° | 1.20 | | | |
| Rapidquell ® Quicklime CL 90-Q | 15.00 | | | |
| Talkum Pharma M ® | 10.00 | | | |
| Omyacarb 5-GU ® | 17.20 | | | |
| Anox 20 ® | 0.50 | | | |
| Desmodur N 3300 ® | 2.10 | | | 10.89 |

The percentage weight fraction of Desmodur N 3300® was selected such that the ratio of the total number of isocyanate groups introduced into the preparation of the chemically precrosslinked, thermally vulcanizable PSA to the total number of hydroxyl groups introduced in the preparation (total NCO/OH ratio) was 0.85.

The results achieved were as follows:

Before Thermal Vulcanization:

| Test method | Substrate | Shearing load | Result | Fracture mode |
|---|---|---|---|---|
| Peel adhesion | Steel | | 7.4 N/cm | |
| Peel adhesion | Aluminium | | 1.5 N/cm | |
| Dynamic L-jig test | Steel | | 110 N/cm | |
| Static shear test | Steel | 500 g | >20 000 minutes | |
| Static shear test | Aluminium | 500 g | 5100 minutes | |
| Dynamic shear test (lap shear strength) | Steel against aluminium | | 0.3 MPa | adhesive to aluminium |

During Thermal Vulcanization:

| Test method | Substrate | Overlap area | Shearing load | Vulcanization conditions | Result |
|---|---|---|---|---|---|
| Static shear test | Steel against aluminium | 312.5 mm² | 200 g | 30 minutes/ 200° C. | Slip distance: 8-10 mm |

After Thermal Vulcanization:

Dynamic Shear Test (Lap Shear Strength), Bonded Substrates: Steel Against Aluminium

| Vulcanization conditions | Temperature during measurement [° C.] | Result [MPa] | Fracture mode |
|---|---|---|---|
| 30 min/180° C. | −20 | not determined | |
| | +23 | 0.6 | cohesive |
| | +80 | not determined | |
| 30 min/200° C. | −20 | 6.1 | cohesive |
| | +23 | 3.1 | cohesive |
| | +80 | 0.3 | cohesive |
| 30 min/220° C. | −20 | not determined | |
| | +23 | 3.9 | cohesive |
| | +80 | not determined | |

Inventive Example 9

The meltable, pressure-sensitively adhesive, hydroxyl-functionalized polybutadiene-polyurethane prepolymer is Prepo 1 from Inventive Example 1.

Production of the inventive chemically precrosslinked, thermally vulcanizable pressure-sensitive adhesive and of the adhesive tape comprising this PSA:

For producing the inventive PSA and the inventive adhesive tape, Prepo 1 (including epoxy resin) was blended further in a laboratory batch in accordance with the formula below, and shaped to form a film. The epoxy resin, already incorporated by mixing during the production of the polybutadiene-polyurethane prepolymer, is listed separately in the following table.

Composition of the Chemically Precrosslinked, Thermally Vulcanizable PSA Based on Prepo 1:

| Raw material | Weight fraction [wt %] | OH-functionalized and NCO-functionalized raw materials introduced into the Prepo 1 preparation | Weight fraction [wt %] | Number of OH or NCO groups introduced, based on percentage weight fraction |
|---|---|---|---|---|
| Prepo 1 (excluding epoxy resin) | 43.20 | Krasol LBH 2000 ® | 15.96 | 14.52 |
| | | Poly bd R-45 HTLO ® | 17.29 | 14.52 |
| | | 2-Ethyl-1,3-hexanediol | 3.19 | 43.57 |
| | | Desmodur W ® | 6.71 | 50.83 |
| Epikote 828 ® (from Prepo 1 preparation) | 10.80 | | | |
| Ground sulfur 80/90° | 3.50 | | | |
| MBTS | 2.00 | | | |
| Rapidquell ® Quicklime CL 90-Q | 15.00 | | | |
| Talkum Pharma M ® | 10.00 | | | |
| Omyacarb 5-GU ® | 12.90 | | | |
| Anox 20 ® | 0.50 | | | |
| Desmodur N 3300 ® | 2.10 | | | 10.89 |

The percentage weight fraction of Desmodur N 3300® was selected such that the ratio of the total number of isocyanate groups introduced into the preparation of the chemically precrosslinked, thermally vulcanizable PSA to the total number of hydroxyl groups introduced in the preparation (total NCO/OH ratio) was 0.85.

The results achieved were as follows:

Before Thermal Vulcanization:

| Test method | Substrate | Shearing load | Result | Fracture mode |
|---|---|---|---|---|
| Peel adhesion | Steel | | 7.9 N/cm | |
| Peel adhesion | Aluminium | | 1.6 N/cm | |
| Dynamic L-jig test | Steel | | 120 N/cm | |
| Static shear test | Steel | 500 g | >20 000 minutes | |
| Static shear test | Aluminium | 500 g | 5800 minutes | |
| Dynamic shear test (lap shear strength) | Steel against aluminium | | 0.3 MPa | adhesive to aluminium |

During Thermal Vulcanization:

| Test method | Substrate | Overlap area | Shearing load | Vulcanization conditions | Result |
|---|---|---|---|---|---|
| Static shear test | Steel against aluminium | 312.5 mm² | 200 g | 30 minutes/ 200° C. | Slip distance: 2-3 mm |

After Thermal Vulcanization:

Dynamic Shear Test (Lap Shear Strength), Bonded Substrates: Steel Against Aluminium

| Vulcanization conditions | Temperature during measurement[° C.] | Result [MPa] | Fracture mode |
|---|---|---|---|
| 30 min/180° C. | −20 | 15.5 | cohesive |
| | +23 | 10.8 | cohesive |
| | +80 | 1.9 | cohesive |
| 30 min/200° C. | −20 | 16.2 | cohesive |
| | +23 | 12.4 | cohesive |
| | +80 | 2.9 | cohesive |
| 30 min/220° C. | −20 | 18.4 | cohesive |
| | +23 | 13.6 | cohesive |
| | +80 | 2.8 | cohesive |

Inventive Example 10

The meltable, pressure-sensitively adhesive, hydroxyl-functionalized polybutadiene-polyurethane prepolymer is Prepo 1 from Inventive Example 1.

Production of the inventive chemically precrosslinked, thermally vulcanizable pressure-sensitive adhesive and of the adhesive tape comprising this PSA:

For producing the inventive PSA and the inventive adhesive tape, Prepo 1 (including epoxy resin) was blended further in a laboratory batch in accordance with the formula below, and shaped to form a film. The epoxy resin, already incorporated by mixing during the production of the polybutadiene-polyurethane prepolymer, is listed separately in the following table.

Composition of the Chemically Precrosslinked, Thermally Vulcanizable PSA Based on Prepo 1:

| Raw material | Weight fraction [wt %] | OH-functionalized and NCO-functionalized raw materials introduced into the Prepo 1 preparation | Weight fraction [wt %] | Number of OH or NCO groups introduced, based on percentage weight fraction |
|---|---|---|---|---|
| Prepo 1 (excluding epoxy resin) | 43.20 | Krasol LBH 2000 ® | 15.96 | 14.52 |
|  |  | Poly bd R-45 HTLO ® | 17.29 | 14.52 |
|  |  | 2-Ethyl-1,3-hexanediol | 3.19 | 43.57 |
|  |  | Desmodur W ® | 6.71 | 50.83 |
| Epikote 828 ® (from Prepo 1 preparation) | 10.80 |  |  |  |
| Avosulf ® IS 75 S | 1.20 |  |  |  |
| MBTS | 2.00 |  |  |  |
| Rapidquell ® Quicklime CL 90-Q | 15.00 |  |  |  |
| Kaolin Pharma ® | 25.20 |  |  |  |
| Anox 20 ® | 0.50 |  |  |  |
| Desmodur N 3300 ® | 2.10 |  |  | 10.89 |

The percentage weight fraction of Desmodur N 3300® was selected such that the ratio of the total number of isocyanate groups introduced into the preparation of the chemically precrosslinked, thermally vulcanizable PSA to the total number of hydroxyl groups introduced in the preparation (total NCO/OH ratio) was 0.85.

The results achieved were as follows:

Before Thermal Vulcanization:

| Test method | Substrate | Shearing load | Result | Fracture mode |
|---|---|---|---|---|
| Peel adhesion | Steel |  | 7.9 N/cm |  |
| Peel adhesion | Aluminium |  | 1.6 N/cm |  |
| Dynamic L-jig test | Steel |  | 102 N/cm |  |
| Static shear test | Steel | 500 g | >20 000 minutes |  |
| Static shear test | Aluminium | 500 g | 5200 minutes |  |
| Dynamic shear test (lap shear strength) | Steel against aluminium |  | 0.3 MPa | adhesive to aluminium |

During Thermal Vulcanization:

| Test method | Substrate | Overlap area | Shearing load | Vulcanization conditions | Result |
|---|---|---|---|---|---|
| Static shear test | Steel against aluminium | 312.5 mm² | 200 g | 30 minutes/ 200° C. | Slip distance: 2-6 mm |

After Thermal Vulcanization:

Dynamic Shear Test (Lap Shear Strength), Bonded Substrates: Steel Against Aluminium

| Vulcanization conditions | Temperature during measurement[° C.] | Result [MPa] | Fracture mode |
|---|---|---|---|
| 30 min/180° C. | −20 | 6.2 | cohesive |
|  | +23 | 2.5 | cohesive |
|  | +80 | 0.4 | cohesive |
| 30 min/200° C. | −20 | 7.6 | cohesive |
|  | +23 | 3.6 | cohesive |
|  | +80 | 0.7 | cohesive |
| 30 min/220° C. | −20 | 8.9 | cohesive |
|  | +23 | 4.3 | cohesive |
|  | +80 | 1.0 | cohesive |

Inventive Example 11

The meltable, pressure-sensitively adhesive, hydroxyl-functionalized polybutadiene-polyurethane prepolymer is Prepo 1 from Inventive Example 1. Production took place in a 200 litre mixing tank.

Production of the inventive chemically precrosslinked, thermally vulcanizable pressure-sensitive adhesive and of the adhesive tape comprising this PSA:

For producing the inventive PSA and the inventive adhesive tape, Prepo 1 (including epoxy resin) was blended further in a twin-screw extruder in accordance with the formula below, and shaped to form a film. The addition of the precrosslinking Desmodur N 3300® was made last. The epoxy resin, already incorporated by mixing during the production of the polybutadiene-polyurethane prepolymer, is listed separately in the following table.

Composition of the chemically precrosslinked, thermally vulcanizable PSA based on Prepo 1:

| Raw material | Weight fraction [wt %] | OH-functionalized and NCO-functionalized raw materials introduced into the Prepo 1 preparation | Weight fraction [wt %] | Number of OH or NCO groups introduced, based on percentage weight fraction |
|---|---|---|---|---|
| Prepo 1 (excluding epoxy resin) | 43.20 | Krasol LBH 2000 ® | 15.96 | 14.52 |
| | | Poly bd R-45 HTLO ® | 17.29 | 14.52 |
| | | 2-Ethyl-1,3-hexanediol | 3.19 | 43.57 |
| | | Desmodur W ® | 6.71 | 50.83 |
| Epikote 828 ® (from Prepo 1 preparation) | 10.80 | | | |
| Ground sulfur 80/90° | 1.20 | | | |
| MBTS | 2.00 | | | |
| Rapidquell ® Quicklime CL 90-Q | 15.00 | | | |
| Talkum Pharma M ® | 10.00 | | | |
| Omyacarb 5-GU ® | 15.20 | | | |
| Anox 20 ® | 0.50 | | | |
| Desmodur N 3300 ® | 2.10 | | | 10.89 |

The percentage weight fraction of Desmodur N 3300® was selected such that the ratio of the total number of isocyanate groups introduced into the preparation of the chemically precrosslinked, thermally vulcanizable PSA to the total number of hydroxyl groups introduced in the preparation (total NCO/OH ratio) was 0.85.

The results achieved were as follows:

Before Thermal Vulcanization:

| Test method | Substrate | Shearing load | Result | Fracture mode |
|---|---|---|---|---|
| Peel adhesion | Steel | | 7.1 N/cm | |
| Peel adhesion | Aluminium | | 1.6 N/cm | |
| Dynamic L-jig test | Steel | | 110 N/cm | |
| Static shear test | Steel | 500 g | >20 000 minutes | |
| Static shear test | Aluminium | 500 g | 5900 minutes | |
| Dynamic shear test (lap shear strength) | Steel against aluminium | | 0.3 MPa | adhesive to aluminium |

During Thermal Vulcanization:

| Test method | Substrate | Overlap area | Shearing load | Vulcanization conditions | Result |
|---|---|---|---|---|---|
| Static shear test | Steel against aluminium | 312.5 mm² | 200 g | 30 minutes/ 200° C. | Slip distance: 2-4 mm |

After Thermal Vulcanization:

Dynamic Shear Test (Lap Shear Strength), Bonded Substrates: Steel Against Aluminium

| Vulcanization conditions | Temperature during measurement [° C.] | Result [MPa] | Fracture mode |
|---|---|---|---|
| 30 min/180° C. | −20 | 6.1 | cohesive |
| | +23 | 3.3 | cohesive |
| | +80 | 0.6 | cohesive |
| 30 min/200° C. | −20 | 8.9 | cohesive |
| | +23 | 4.2 | cohesive |
| | +80 | 0.9 | cohesive |
| 30 min/220° C. | −20 | 8.9 | cohesive |
| | +23 | 4.1 | cohesive |
| | +80 | 0.9 | cohesive |

Comparative Example 1

The meltable, pressure-sensitively adhesive, hydroxyl-functionalized polybutadiene-polyurethane prepolymer is Prepo 1 from Inventive Example 1.

Production of the Thermally Vulcanizable Pressure-Sensitive Adhesive and of the Adhesive Tape Comprising this PSA (Comparative Example 1):

For producing the Comparative Example 1 and the corresponding adhesive tape, Prepo 1 (including epoxy resin) was blended further in a laboratory batch in accordance with the formula below, and shaped to form a film. The epoxy resin, already incorporated by mixing during the production of the polybutadiene-polyurethane prepolymer, is listed separately in the following table.

Composition of the thermally vulcanizable PSA based on Prepo 1 (Comparative Example 1):

| Raw material | Weight fraction [wt %] | OH-functionalized and NCO-functionalized raw materials introduced into the Prepo 1 preparation | Weight fraction [wt %] | Number of OH or NCO groups introduced, based on percentage weight fraction |
|---|---|---|---|---|
| Prepo 1 (excluding epoxy resin) | | Krasol LBH 2000 ® | 15.96 | 14.52 |
| | | Poly bd R-45 HTLO ® | 17.29 | 14.52 |
| | | 2-Ethyl-1,3-hexanediol | 3.19 | 43.57 |
| | | Desmodur W ® | 6.71 | 50.83 |
| Epikote 828 ® (from Prepo 1 preparation) | 10.80 | | | |
| Ground sulfur 80/90° | 1.20 | | | |
| MBTS | 2.00 | | | |
| Rapidquell ® Quicklime CL 90-Q | 15.00 | | | |
| Talkum Pharma M ® | 10.00 | | | |
| Omyacarb 5-GU ® | 17.30 | | | |
| Anox 20 ® | 0.50 | | | |

The results achieved were as follows:

Before Thermal Vulcanization:

| Test method | Substrate | Shearing load | Result | Fracture mode |
|---|---|---|---|---|
| Peel adhesion | Steel | | 9.4 N/cm | |
| Peel adhesion | Aluminium | | 3.1 N/cm | |
| Dynamic L-jig test | Steel | | 97 N/cm | |
| Static shear test | Steel | 500 g | <60 minutes | |
| Static shear test | Aluminium | 500 g | <60 minutes | |
| Dynamic shear test (lap shear strength) | Steel against aluminium | | 0.1 MPa | adhesive to aluminium |

During Thermal Vulcanization:

| Test method | Substrate | Overlap area | Shearing load | Vulcanization conditions | Result |
|---|---|---|---|---|---|
| Static shear test | Steel against aluminium | 312.5 mm² | 200 g | 30 minutes/ 200° C. | Failure (complete slippage) after less than 5 minutes |

After Thermal Vulcanization:

Dynamic Shear Test (Lap Shear Strength), Bonded Substrates: Steel Against Aluminium

| Vulcanization conditions | Temperature during measurement[° C.] | Result [MPa] | Fracture mode |
|---|---|---|---|
| 30 min/180° C. | −20 | 6.6 | cohesive |
| | +23 | 2.8 | cohesive |
| | +80 | 0.5 | cohesive |
| 30 min/200° C. | −20 | 8.3 | cohesive |
| | +23 | 3.4 | cohesive |
| | +80 | 0.7 | cohesive |
| 30 min/220° C. | −20 | 8.2 | cohesive |
| | +23 | 3.6 | cohesive |
| | +80 | 0.8 | cohesive |

Comparative Example 2

The meltable, pressure-sensitively adhesive, hydroxyl-functionalized polybutadiene-polyurethane prepolymer is Prepo 2 from Inventive Example 2.

Production of the Thermally Vulcanizable Pressure-Sensitive Adhesive and of the Adhesive Tape Comprising this PSA (Comparative Example 2):

For producing the Comparative Example 2 and the corresponding adhesive tape, Prepo 2 (including epoxy resin) was blended further in a laboratory batch in accordance with the formula below, and shaped to form a film. The epoxy resin, already incorporated by mixing during the production of the polybutadiene-polyurethane prepolymer, is listed separately in the following table.

Composition of the Thermally Vulcanizable PSA Based on Prepo 2 (Comparative Example 2):

| Raw material | Weight fraction [wt %] | OH-functionalized and NCO-functionalized raw materials introduced into the Prepo 2 preparation | Weight fraction [wt %] | Number of OH or NCO groups introduced, based on percentage weight fraction |
|---|---|---|---|---|
| Prepo 2 (excluding epoxy resin) | 43.20 | Krasol LBH 2000 ® | 32.93 | 29.97 |
| | | 2-Ethyl-1,3-hexanediol | 3.29 | 44.95 |
| | | Desmodur W ® | 6.93 | 52.44 |
| Epikote 828 ® (from Prepo 2 preparation) | 10.80 | | | |
| Ground sulfur 80/90° | 1.20 | | | |
| MBTS | 2.00 | | | |
| Rapidquell ® Quicklime CL 90-Q | 15.00 | | | |
| Talkum Pharma M ® | 10.00 | | | |
| Omyacarb 5-GU ® | 17.30 | | | |
| Anox 20 ® | 0.50 | | | |

The results achieved were as follows:
Before Thermal Vulcanization:

| Test method | Substrate | Shearing load | Result | Fracture mode |
|---|---|---|---|---|
| Peel adhesion | Steel | | 9.5 N/cm | |
| Peel adhesion | Aluminium | | 2.5 N/cm | |
| Dynamic L-jig test | Steel | | 82 N/cm | |
| Static shear test | Steel | 500 g | <60 minutes | |
| Static shear test | Aluminium | 500 g | <60 minutes | |
| Dynamic shear test (lap shear strength) | Steel against aluminium | | 0.2 MPa | adhesive to aluminium |

During Thermal Vulcanization:

| Test method | Substrate | Overlap area | Shearing load | Vulcanization conditions | Result |
|---|---|---|---|---|---|
| Static shear test | Steel against aluminium | 312.5 mm² | 200 g | 30 minutes/ 200° C. | Failure (complete slippage) after less than 5 minutes |

After Thermal Vulcanization:
Dynamic Shear Test (Lap Shear Strength), Bonded Substrates: Steel Against Aluminium

| Vulcanization conditions | Temperature during measurement[° C.] | Result [MPa] | Fracture mode |
|---|---|---|---|
| 30 min/180° C. | −20 | 6.7 | cohesive |
| | +23 | 2.3 | cohesive |
| | +80 | 0.3 | cohesive |
| 30 min/200° C. | −20 | 7.1 | cohesive |
| | +23 | 3.5 | cohesive |
| | +80 | 0.5 | cohesive |
| 30 min/220° C. | −20 | 8.1 | cohesive |
| | +23 | 4.0 | cohesive |
| | +80 | 0.7 | cohesive |

The invention claimed is:

1. A thermally vulcanizable pressure-sensitive adhesive comprising:
   a chemically precrosslinked, pressure-sensitively adhesive polybutadiene-polyurethane;
   epoxy resin; and
   ground sulfur.

2. The thermally vulcanizable pressure-sensitive adhesive according to claim 1, wherein the chemically precrosslinked, pressure-sensitively adhesive polybutadiene-polyurethane is a chemical reaction product of at least one meltable, pressure-sensitively adhesive, hydroxyl-functionalized polybutadiene-polyurethane prepolymer that is the chemical reaction product of at least one or more polybutadiene-polyols and/or derivates thereof.

3. The thermally vulcanizable pressure-sensitive adhesive according to claim 1, wherein the chemically precrosslinked, pressure-sensitively adhesive polybutadiene-polyurethane is a chemical reaction product of at least one meltable, pressure-sensitively adhesive, hydroxyl-functionalized polybutadiene-polyurethane prepolymer that is the chemical reaction product of at least one or more polybutadiene-polyols and/or derivates thereof and of one or more other polyols and/or derivatives thereof.

4. The thermally vulcanizable pressure-sensitive adhesive according to claim 1 wherein the chemically precrosslinked, pressure-sensitively adhesive polybutadiene-polyurethane is a chemical reaction product of at least one meltable, pressure-sensitively adhesive, hydroxyl-functionalized polybutadiene-polyurethane prepolymer that is or comprises the chemical reaction product of
   at least one polybutadiene-diol and/or polybutadiene-diol derivative, in each case having a number-averaged average functionality of between greater than 1.5 and less than or equal to 2.0, and/or
   at least one polybutadiene-polyol and/or polybutadiene-polyol derivative, in each case having a number-averaged average functionality of between greater than 2.0 and less than or equal to 3.0, and
   at least one chain extender having a hydroxyl-functionality of two and a molar mass of less than or equal to 300 g/mol.

5. The thermally vulcanizable pressure-sensitive adhesive according to claim 1, wherein
the chemically precrosslinked, pressure-sensitively adhesive polybutadiene-polyurethane is a chemical reaction product of at least one meltable, pressure-sensitively adhesive, hydroxyl-functionalized polybutadiene-polyurethane prepolymer, and
a numerical fraction of hydroxyl groups introduced for forming the meltable, pressure-sensitively adhesive, hydroxyl-functionalized polybutadiene-polyurethane prepolymer and originating from at least one chain extender is between greater than or equal to 20.0% and less than or equal to 80.0%.

6. The thermally vulcanizable pressure-sensitive adhesive according to claim 1, wherein
the chemically precrosslinked, pressure-sensitively adhesive polybutadiene-polyurethane is a chemical reaction product of at least one meltable, pressure-sensitively adhesive, hydroxyl-functionalized polybutadiene-polyurethane prepolymer, and
a numerical fraction of hydroxyl groups introduced for forming the at least one meltable, pressure-sensitively adhesive, hydroxyl-functionalized polybutadiene-polyurethane prepolymer and originating from at least one polybutadiene-polyol and/or polybutadiene-polyol derivative having a number-averaged average functionality of between greater than 2.0 and less than or equal to 3.0, is between greater than or equal to 0.0% and less than or equal to 50.0%.

7. The thermally vulcanizable pressure-sensitive adhesive according to claim 1 wherein the thermally vulcanizable pressure-sensitive adhesive is composed of the following fractions:
   30.0-55.0 wt % of the chemically precrosslinked, pressure-sensitively adhesive polybutadiene-polyurethane;
   0.1-15.0 wt % of the ground sulfur;
   0.1-10.0 wt % of vulcanization accelerators;
   1.0-20.0 wt % of the epoxy resin;
   5.0-30.0 wt % of ground calcium oxide;
   10.0-50.0 wt % of fillers selected from ground chalk, ground talc and/or ground kaolin; and
   optionally ageing inhibitors, tackifier resins, bitumen, plasticizers, oils, and other auxiliaries and adjuvants.

8. An adhesive tape comprising the thermally vulcanizable pressure-sensitive adhesive according to claim 1.

* * * * *